United States Patent
Beasley et al.

(10) Patent No.: US 11,905,944 B2
(45) Date of Patent: Feb. 20, 2024

(54) FLAP VALVE FOR DIAPHRAGM PUMP

(71) Applicant: Warren Rupp, Inc., Mansfield, OH (US)

(72) Inventors: Robert Beasley, Mansfield, OH (US); Brent Morris, Mansfield, OH (US); Jim Rockwell, Mansfield, OH (US); John Wawrowski, Mansfield, OH (US)

(73) Assignee: Warren Rupp, Inc., Mansfield, OH (US)

( * ) Notice: Subject to any disclaimer, the term of this patent is extended or adjusted under 35 U.S.C. 154(b) by 104 days.

(21) Appl. No.: 17/704,799

(22) Filed: Mar. 25, 2022

(65) Prior Publication Data

US 2022/0307493 A1 Sep. 29, 2022

Related U.S. Application Data

(60) Provisional application No. 63/165,955, filed on Mar. 25, 2021.

(51) Int. Cl.
*F16K 15/03* (2006.01)
*F04B 53/10* (2006.01)
*F04B 43/02* (2006.01)

(52) U.S. Cl.
CPC .......... *F04B 53/1042* (2013.01); *F04B 43/02* (2013.01); *F04B 53/1092* (2013.01); *F16K 15/034* (2021.08)

(58) Field of Classification Search
CPC .... F04B 53/1037; F04B 53/104; F16K 15/03; F16K 15/033; F16K 15/034
See application file for complete search history.

(56) References Cited

U.S. PATENT DOCUMENTS 1,576,712 A * 3/1926 Bold ............... F16K 15/03
137/527.6
3,358,709 A 12/1967 Thresher et al.
(Continued)

FOREIGN PATENT DOCUMENTS

GB 2393775 A 4/2007
IT 202000023116 A1 * 3/2022
(Continued)

OTHER PUBLICATIONS

International Search Report and Written Opinion from corresponding International Application No. PCT/US2022/021937 dated Jun. 22, 2022, 23 pages.
(Continued)

*Primary Examiner* — Hailey K. Do
(74) *Attorney, Agent, or Firm* — Tucker Ellis LLP; Heather M. Barnes; Michael G. Craig

(57) ABSTRACT

One or more techniques and/or systems are disclosed for a flap valve in a diaphragm pump. The flap valve includes a body and a self-centering hinge portion. A front portion of the body includes a front surface having a raised portion and a recessed portion. The front surface is configured to form a seal with a surface of the pump when the body is in a closed position, the surface of the pump being at an inlet or an outlet of a pumping chamber. The body is configured to allow a downstream flow of a fluid when the flap valve is in an open position. The self-centering hinge portion is operably connected to the body. The self-centering hinge portion has a dynamically changing longitudinal axis. The body is configured to simultaneously translate and rotate about the dynamically changing longitudinal axis to form the seal.

17 Claims, 16 Drawing Sheets

(56) References Cited

U.S. PATENT DOCUMENTS

| | | | |
|---|---|---|---|
| 3,677,289 A | | 7/1972 | Rivers et al. |
| 3,933,173 A | * | 1/1976 | Kajita .................. F16K 15/03 137/515.7 |
| 3,955,592 A | * | 5/1976 | Guyton ................ F16K 15/03 137/329 |
| 3,955,901 A | * | 5/1976 | Hamilton ............ F04B 43/073 137/855 |
| 4,223,697 A | * | 9/1980 | Pendleton ............ F16K 15/03 251/900 |
| 4,274,436 A | * | 6/1981 | Smith ................ F16K 27/0232 137/527 |
| 4,842,014 A | * | 6/1989 | Strelow ................ F16K 15/03 137/527.2 |
| 2005/0247349 A1 | | 11/2005 | Barrows et al. |
| 2007/0068579 A1 | | 3/2007 | Hsing |
| 2008/0308159 A1 | * | 12/2008 | Stunkard ............ F16K 27/0209 137/315.33 |
| 2014/0000739 A1 | | 1/2014 | Nomura et al. |
| 2017/0241415 A1 | | 8/2017 | Bazan |
| 2017/0299074 A1 | | 10/2017 | Masaki |

FOREIGN PATENT DOCUMENTS

| | | |
|---|---|---|
| WO | 9318305 A1 | 9/1993 |
| WO | 2004067965 A1 | 8/2004 |
| WO | 2010085840 A1 | 8/2010 |

OTHER PUBLICATIONS

"PS810/1510 Brahma Bolted Metal Pump," EOM Engineering Operations & Maintenance, May 2018, 8 pages, WILDEN, PSG California LLC.

"Brahma Series Large Solids Handling Pumps," Jun. 2019, 5 pages, WILDEN, PSG California LLC.

"Clean Performance that Meets the Highest Standards," Feb. 10, 2017, 16 pages, WILDEN, PSG California LLC.

"2" Diaphragm Pump 1:1 Ratio, Flap Valvew (Metallic)," Operator's Manual Including: Operation, Installation & Maintenance, Jul. 15, 2016, 8 pages, Bryan, Ohio.

"Flap Valve," PF20X-XXX-SXX-B 172 GPM (651 LPM) [online], Jan. 25, 2021, Retrieved from the Internet <URL:https://www.arozone.com/en-US/diaphragm-pumps/specialty/flap-valve>.

"Yamada Solid Pro Designed To Pump Fluid Containing Solids," Yamada, 2012, 4 pages.

"Yamada Solid Pro Designed To Pump Fluid Containing Solids," Yamada Pumps, Nov. 9, 2012, 4 pages.

"TC-X500 Metallic Flap Valve," Air Operated Double Diaphragm Pumps, TC-X, 2020, 2 pages.

"TC-X500 Series Metallic Flap Valve Pumps," IWAKI AIR [online], Sep. 29, 2020, Retrieved from the Internet <URL:https://iwakiair.com/portfolio-items/tcx500-flapvalve/>.

"Exploded View Drawing and Parts List," Model: TC-X500AS-HV-FLA, Model No. 1M00422MN, IWAKI, Nov. 26, 2020, 5 pages.

"SaniForce 2.0, Large Particle, Poultry, and Meat Air & Electric Double Diaphragm Pumps," GRACO, Sep. 2019, 2 pages.

"SaniForce High Sanitation Diaphragm Pumps," GRACO, Feb. 2021, pp. 1-3, 32-34.

"Murzan Flap Valves and Flap Valve Housings," Voigt-Abernathy Store [online], May 18, 2019, 2 pages, Retrieved from the Internet <URL:https://voigtabstore.com/replacement-pump-parts/murzan/murzan-flap-valves/>.

"The PI-50," Murzan [online], Mar. 20, 2019, 7 pages, The Wayback Machine—https://web.archive.org/web/20190330054753/https://www.murzan.com/sanitary-pumps; Retrieved from the Internet <URL:https://www.murzan.com/sanitary-pumps>.

"The Murzan PI 50 Sanitary Pump Gently Handles the Widest Range of Viscosities and Particle Sizes Up to 6" (15 cm)," 2018, 2 pages.

"High Volume Pneumatic Diaphragm Pump, HV100SY—4"/100mm Slurry Valve," Pumps 2000, May 2020, 2 pages.

"Valve Designs Explained," [online], Nov. 11, 2013, Retrieved from the Internet <URL:https://www.megator.co.uk/download/13747-TDS%20P2K%20Valves%20Explained.pdf>.

"Springer Pumps Service and Operating Manual—Model SSA2-A," Springer Pumps, LLC, Mar. 18, 2016, Rev. 0316, 13 pages.

* cited by examiner

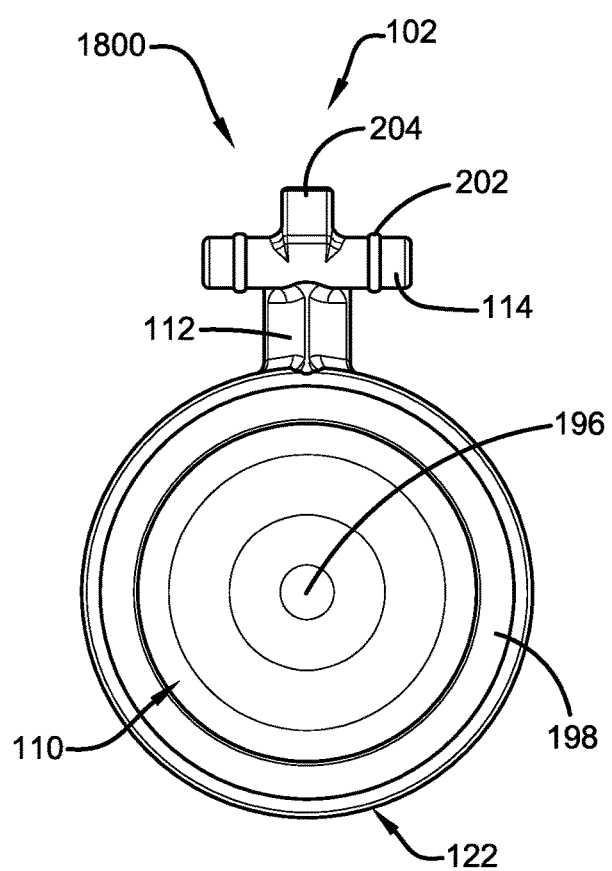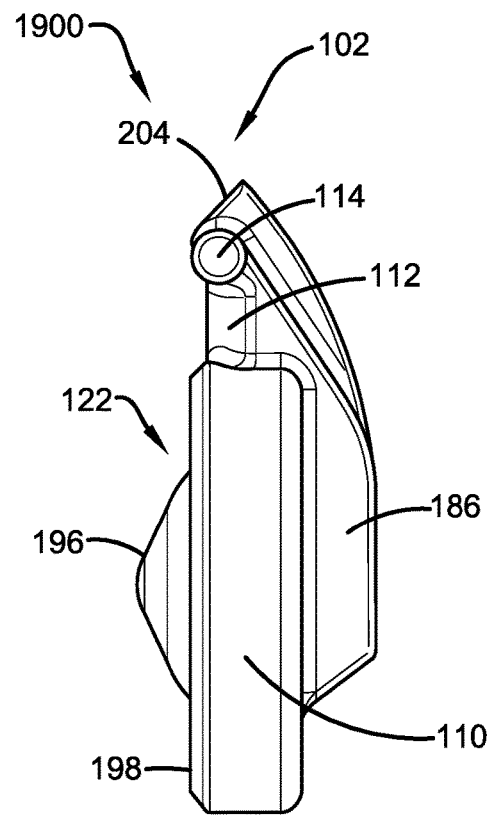
FIG. 18     FIG. 19

FLAP VALVE FOR DIAPHRAGM PUMP

This application claims priority to U.S. Provisional Ser. No. 63/165,955 filed on Mar. 25, 2021, which is incorporated herein by reference.

BACKGROUND

Fluid-operated pumps, such as diaphragm pumps, are widely used particularly for pumping liquids, solutions, viscous materials, slurries, suspensions or flowable solids. Double diaphragm pumps are well known for their utility in pumping viscous or solids-laden liquids, as well as for pumping plain water or other liquids, and high or low viscosity solutions based on such liquids. Accordingly, such double diaphragm pumps have found extensive use in pumping out sumps, shafts, and pits, and generally in handling a great variety of slurries, sludges, and waste-laden liquids. Fluid driven diaphragm pumps offer certain further advantages in convenience, effectiveness, portability, and safety. Double diaphragm pumps are rugged and compact and, to gain maximum flexibility, are often served by a single intake line and deliver liquid through a short manifold to a single discharge line.

Although diaphragm pumps work well for their intended purpose, several disadvantages exist. For example, air operated double diaphragm (AODD) pumps typically use a check valve, such as a rubber ball or flap, to control the flow of fluid inside one or more pumping chambers of the pump. The fluid being pumped, placement of the check valve, and other factors influence whether a rubber ball, a flap, or some other check valve is used in the pump. Pumps that utilize flap check valves are subject to a number of issues that may be exacerbated when pumping viscous slurries and small solids. For example, the flap valves may be held open when the flap valves should be closed or may be prevented from opening fully when an open position is desired due to debris or buildup from the fluid. Flap valves (especially flaps made of rubber) are subject to shorter service life than ball check valves. For example, the service life of flap valves can be worsened by fatigue, erosion, or chemicals. Therefore, there may be a need for an improved flap valve design for diaphragm pumps to solve at least the above-mentioned issues.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In accordance with an implementation of the present disclosure, a flap valve for a diaphragm pump is disclosed. The flap valve comprises a body and a self-centering hinge portion. The body is configured to move between an open position and a closed position. The body has a front portion and a rear portion. The front portion includes a front surface comprising a raised portion and a recessed portion. The front surface is configured to form a seal with a surface of the pump when the body is in a closed position. The body is configured to allow a downstream flow of a fluid when the flap valve is in an open position. The surface of the pump is disposed at an inlet portion or an outlet portion of a pumping chamber within the pump. The self-centering hinge portion is operably connected to the body and operably connected to the surface of the pump. The self-centering hinge portion has a dynamically changing longitudinal axis. The body is configured to translate about the dynamically changing longitudinal axis and simultaneously rotate about the dynamically changing longitudinal axis to close against the surface of the pump.

In accordance with another implementation of the present disclosure, a flap valve for a diaphragm pump is disclosed. The flap valve comprises a body and a self-centering hinge portion. The body is configured to switch between an open position and a closed position. The body comprises a front portion configured to sealingly engage with a valve seat, wherein the front portion faces a valve inlet portion. The body also comprises a rear portion oppositely disposed from the front portion, wherein the rear portion is downstream a valve outlet portion, the valve seat disposed between the valve inlet portion and the valve outlet portion and comprising an opening between the valve inlet portion and the valve outlet portion. The self-centering hinge portion is operably connected to the body, wherein the self-centering hinge portion translates about an x-axis and rotates about a dynamically changing longitudinal axis, wherein the dynamically changing longitudinal axis moves about a y-and/or z-axis.

In accordance with yet another implementation of the present disclosure, a flap valve for a diaphragm pump is disclosed. The flap valve comprises a body, a self-centering hinge portion, a stem portion, a retainer structure, a bias pad, and a rigid stop structure. The body is configured to move between an open position and a closed position. The body comprises a front portion and a rear portion. The front portion is configured to sealingly engage with a valve seat and faces a valve inlet portion. The rear portion is oppositely disposed from the front portion and is downstream a valve outlet portion. The valve seat is disposed between the valve inlet portion and the valve outlet portion and comprises an opening between the valve inlet portion and the valve outlet portion. The self-centering hinge portion is operably connected to the body and operably connected to the valve seat. The self-centering hinge portion has a dynamically changing longitudinal axis. The body is configured to translate about the dynamically changing longitudinal axis and to simultaneously rotate about the dynamically changing longitudinal axis to close against the valve seat. The self-centering hinge portion translates about an x-axis and rotates about a dynamically changing longitudinal axis. The dynamically changing longitudinal axis moves about a y-and/or z-axis. The stem portion is operably connected to and extending from the rear portion. The retainer structure is operably connected to the valve seat. The retainer structure comprises a cavity defined therein that is configured to receive the self-centering hinge portion to rotatably fix the body to the valve seat at the self-centering hinge portion. The cavity has dimensions that are larger than dimensions of the self-centering hinge portion such that the self-centering hinge portion can float in multiple directions within the cavity of the retainer structure to sealingly engage the body to the valve seat, the retainer structure having a gap defined therein to receive the stem portion. The bias pad is operably connected to the retainer structure, the bias pad configured to apply force to the rear surface of the body against the direction of fluid flow. The bias pad comprises a flexible material. The rigid stop structure is operably connected to the bias pad, the rigid stop structure configured to limit rotation of the bias pad and the body. The body, the self-centering hinge portion and the retainer structure are a single unitary piece.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTON OF DRAWINGS

What is disclosed herein may take physical form in certain parts and arrangement of parts, and will be described in detail in this specification and illustrated in the accompanying drawings which form a part hereof and wherein.

Figure 12:
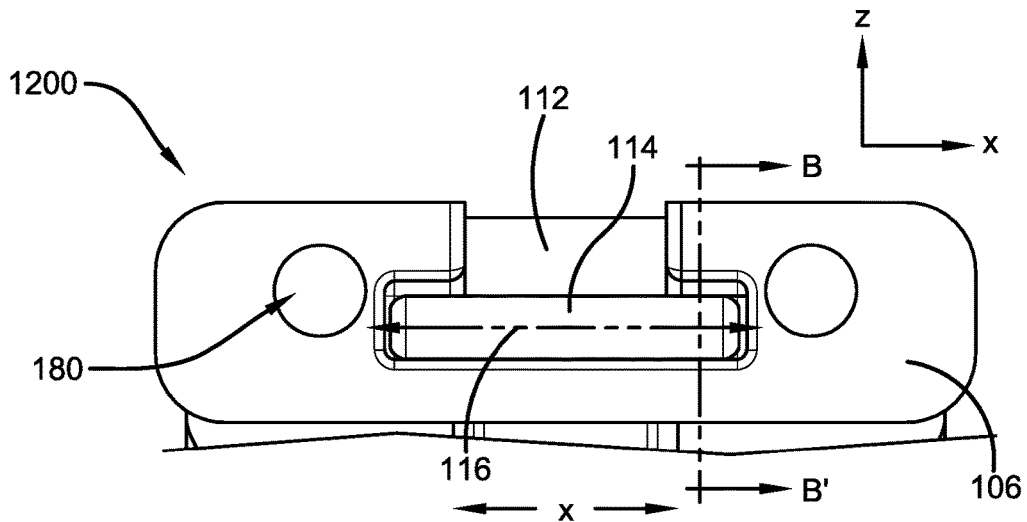
Figure 13:
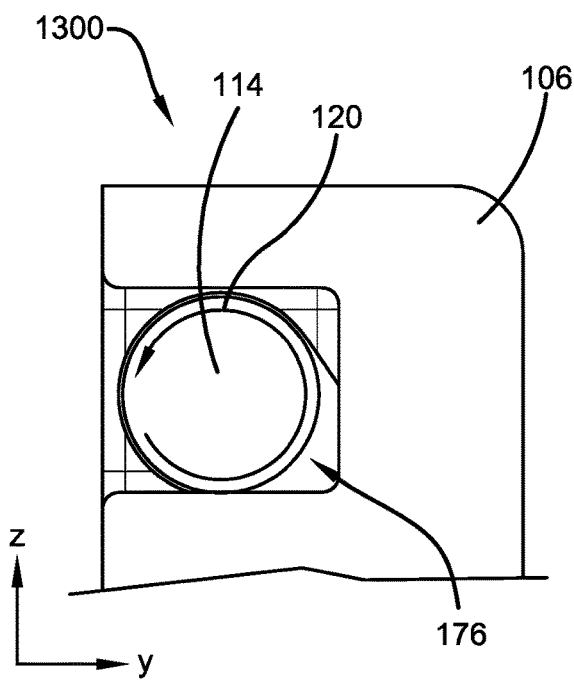
Figure 14:
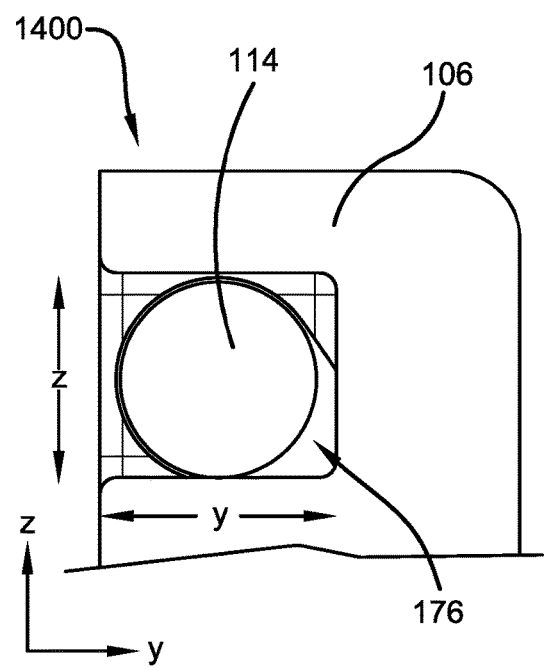

FIGS. 12, 13, and 14 illustrate various views of some implementations of a self-centering hinge portion disposed within the retainer structure disclosed herein.

Figure 15:
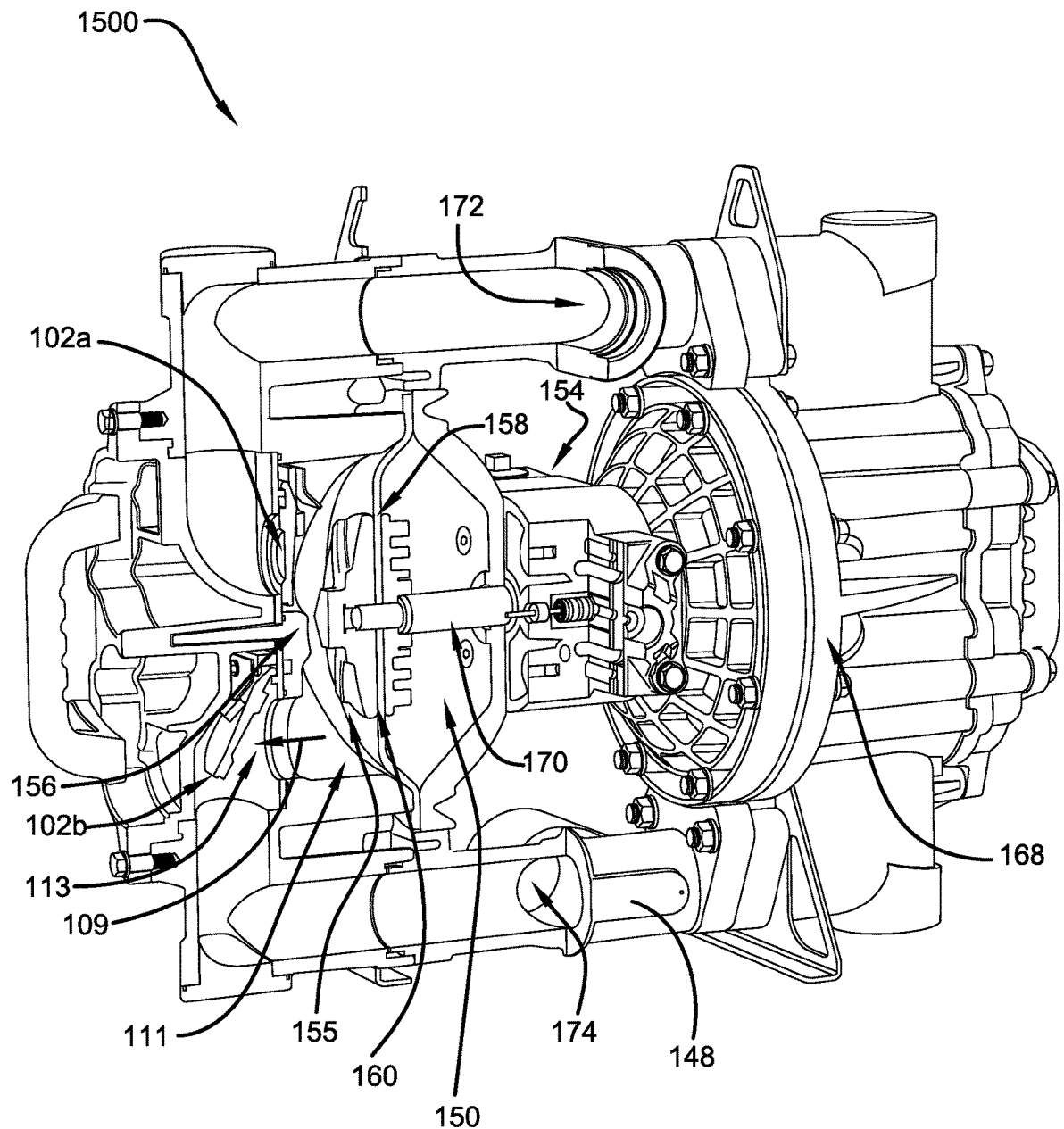

FIG. 15 illustrates a partial cross-section of a perspective view of some other implementations of a diaphragm pump disclosed herein.

Figure 16:
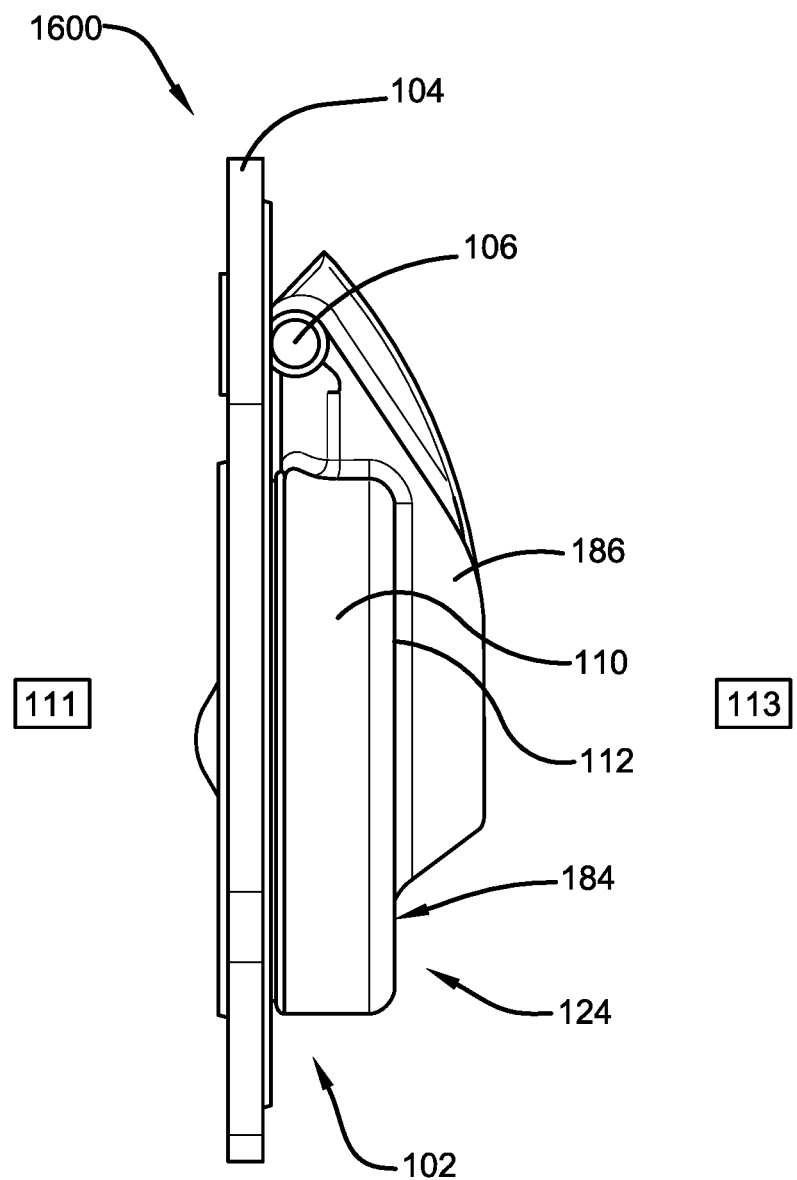

FIG. 16 illustrates a side view of some other implementations of a flap valve disclosed herein in the closed position.

Figure 17:
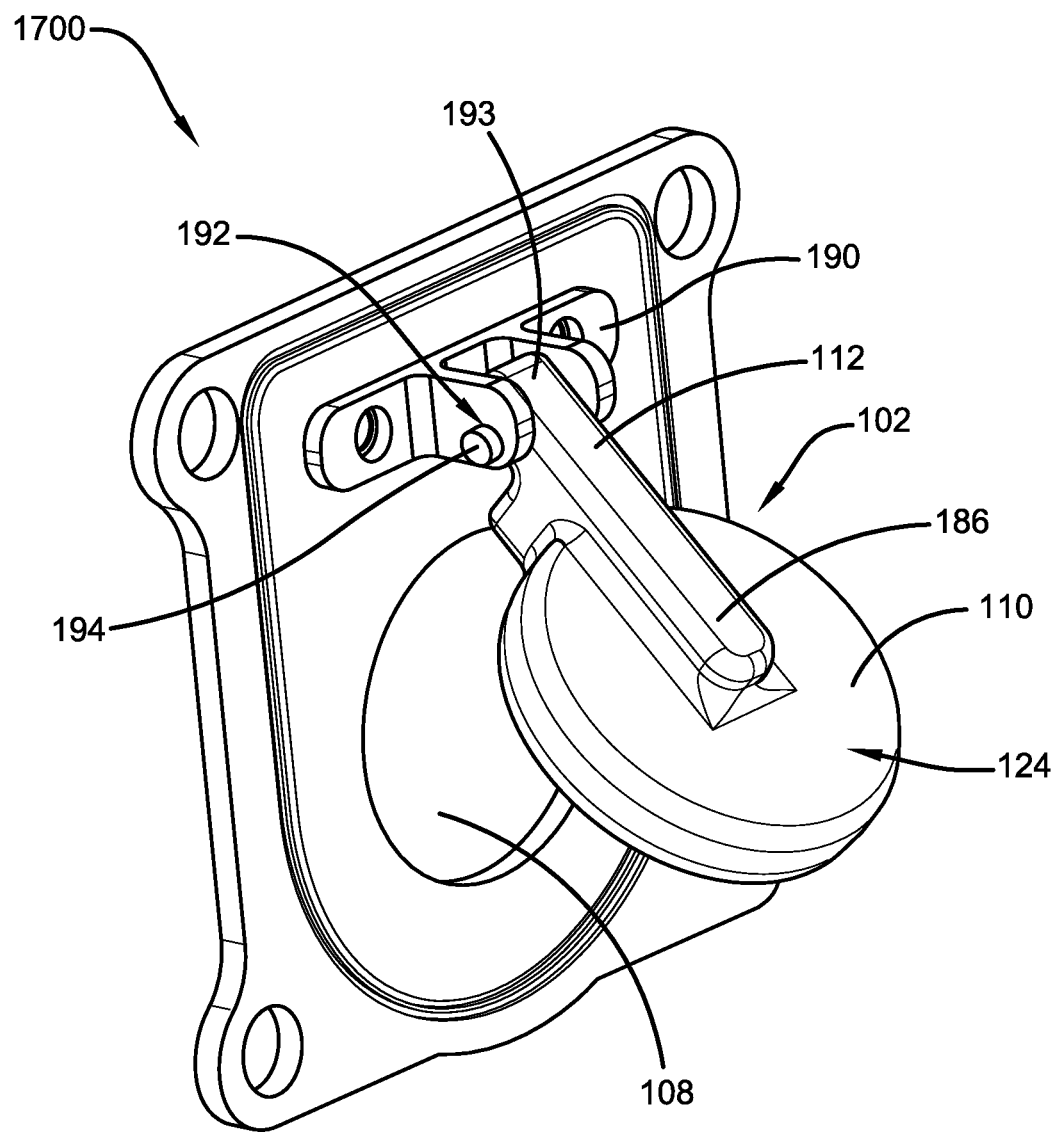

FIG. 17 illustrates a perspective view of some other implementations of a valve assembly disclosed herein.

FIGS. 18 and 19 illustrate a front view and a side view, respectively, of some other implementations of a flap valve disclosed herein.

Figure 20:
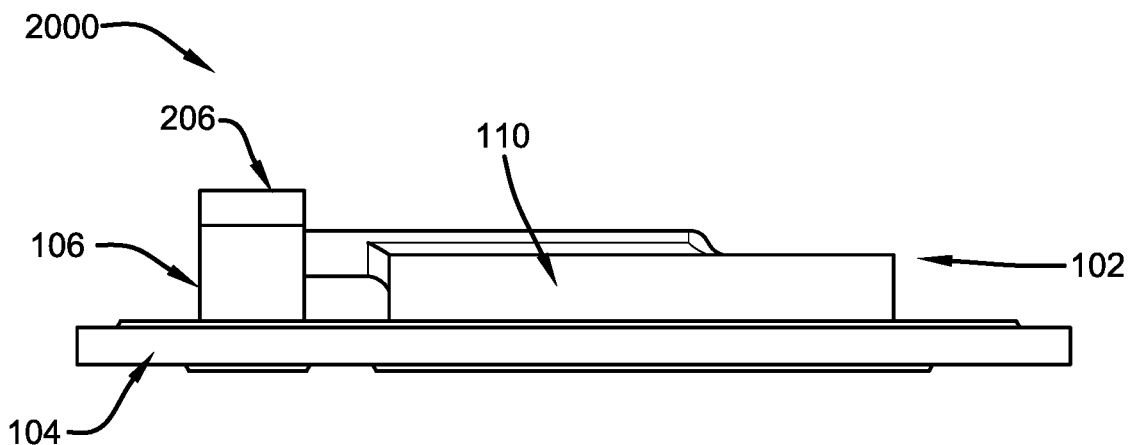
Figure 21:
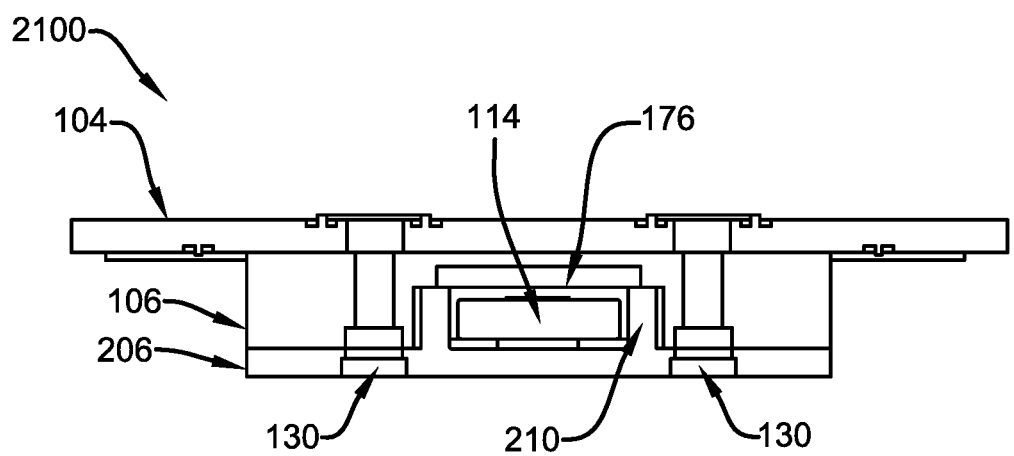

FIGS. 20 and 21 illustrate a side view and a top view, respectively, of yet another implementation of a valve assembly disclosed herein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
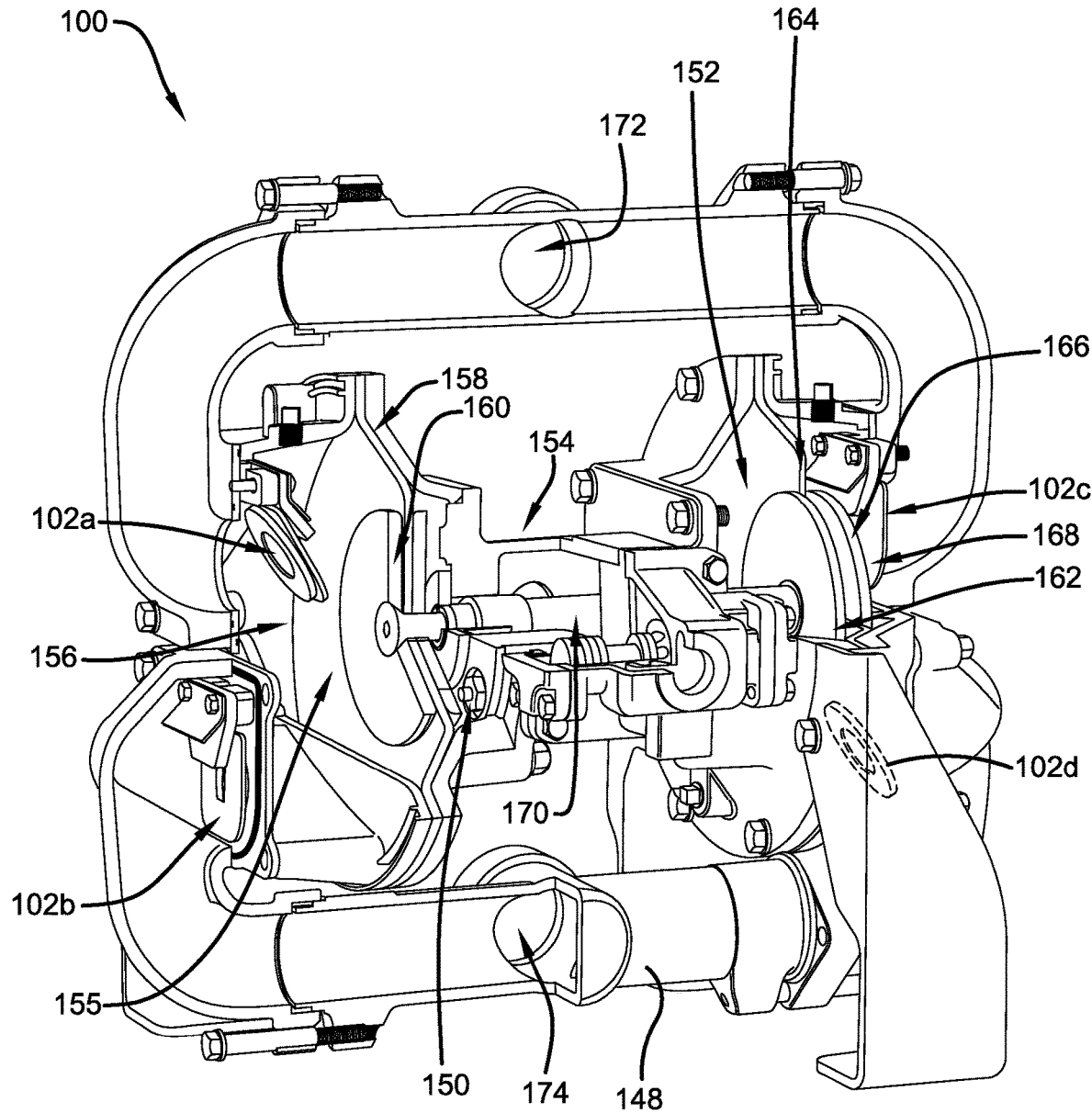
FIG. 1 illustrates a partial cross-section of some implementations a perspective view of some implementations of a diaphragm pump comprising a valve assembly disclosed herein.

FIG. 1 illustrates a partial cross-section of a perspective view 100 of some implementations of an exemplary diaphragm pump comprising some embodiments of a flap valve disclosed herein.

In some implementations, the diaphragm pump may comprise a housing 148, a first diaphragm assembly 156, a second diaphragm assembly 162, a center section 154, and a power supply (not shown). The center section 154 may comprise various spools, airflow passageways, air inputs, air outputs, control sensors, and other features configured to operate the first and second diaphragm assemblies 156, 162. The first diaphragm assembly 156 may include a first diaphragm chamber 150, a first diaphragm 158, and a first diaphragm plate 160. The first diaphragm 158 may be coupled to the first diaphragm plate 160 and may extend across the first diaphragm chamber 150 thereby forming a first movable wall defining a first pumping chamber 155. The second diaphragm assembly 162 may be substantially the same as the first diaphragm assembly 156 and may comprise a second diaphragm chamber 152, a second diaphragm 164, and a second diaphragm plate 166. The second diaphragm 164 may be coupled to the second diaphragm plate 166 and may extend across the second diaphragm chamber 152 to define a second pumping chamber 168. A connecting rod 170 may be operatively connected to and extend between the first diaphragm plate 160 and the second diaphragm plate 166.

The pump may have an inlet pipe 172 and an outlet pipe 174 to accommodate a flow of a fluid. The fluid may travel from the inlet pipe 172 to the outlet pipe 174 in the direction of gravity; in other words, the inlet pipe 172 may be disposed above the outlet pipe 174 such that gravity assists the fluid flow through the pump. The fluid flows through the first or second pumping chambers 155, 168 as it travels from the inlet pipe 172 and to the outlet pipe 174. In some implementations, the pump is configured to accommodate various types of fluids such as, for example, liquids, solutions, viscous materials, slurries, suspensions or flowable solids. Flap valves disclosed herein (e.g., 1102a-d) may control the fluid entering or exiting the pumping chambers 155, 168 of the diaphragm pump. The diaphragm pump may be, for example, an air operated diaphragm pump or an electrically operated diaphragm pump.

A first flap valve 102a may be disposed at an input or suction side of the first pumping chamber 155, and a second flap valve 102b may be disposed at an output or discharge side of the first pumping chamber 155. The flap valves 102a; 102b may be fixed between an inlet portion and an outlet portion at a surface within the pump to control fluid flow through an opening that separates the inlet portion and the outlet portion. The flap valves 102a, 102b are each configured to create a seal with a surface of the pump that is over the opening when in a closed position to stop fluid flow through the opening and are each configured to switch from the closed position and into an open position to allow fluid flow through the opening. The first flap valve 102a is fixed within the pump such that the first flap valve 102a rotates towards the first pumping chamber 155 when in the open position, whereas the second flap valve 102b is fixed within the pump such that the second flap valve 102b rotates away from the first pumping chamber 155 when in the open position. In other words, as will be described further in FIG.

2, each of the first and second flap valves 102*a*, 102*b* are disposed on a downstream side of their respective openings.

To pump fluid from the inlet pipe 172 to the outlet pipe 174 of the pump, the first and second flap valves 102*a*, 102*b* each switch between open and closed positions, but are always switching between opposite positions from one another. In other words, the first flap valve 102*a* may be in the open position while the second flap valve 102*b* is in the closed position (as shown in FIG. 1), and as the first flap valve 102*a* switches from the open position to the closed position, the second flap valve 102*b* simultaneously switches from the closed position to the open position (not shown).

During operation of the pump, when the first flap valve 102*a* is in the open position to allow fluid to flow from the inlet pipe 172 and into the first pumping chamber 155, the second flap valve 102*b* is in the closed position such that the fluid fills the first pumping chamber 155. Then, the first diaphragm plate 160 may compress the first pumping chamber 155 such that the first flap valve 102*a* is forced closed due to pressure from air filling the first diaphragm chamber 150 and due to the configuration of the first flap valve 102*a*. As the first flap valve 102*a* is forced into the closed position, the second flap valve 102*b* is forced into the open position causing the fluid to leave the first pumping chamber 155 and flow towards the outlet pipe 174 of the pump. Then, the first diaphragm plate 160 moves to the towards the second diaphragm assembly 162 to enlarge the first diaphragm chamber 150, which creates a suction such that forces the second flap valve 102*b* into the closed position and that forces the first flap valve 102*a* into the open position to allow fluid to flow into the first pumping chamber 155. These steps can be continuously repeated to provide a constant flow of fluid from the inlet pipe 172 to the outlet pipe 174 of the pump.

Similarly, when the first diaphragm plate 160 is in a compressed position, the second diaphragm plate 166 is in an open position, a third flap valve 102*c* of the second diaphragm assembly 162 is in the open position, and a fourth flap valve 102*d* of the second diaphragm assembly 162 is in the closed position. The third flap valve 102*c* may be disposed at an input or suction side of the second pumping chamber 168, and the fourth flap valve 102*d* may be disposed at an output or discharge side of the second pumping chamber 168. It will be appreciated that the fourth flap valve 102*d* is disposed behind the housing 148 and thus is not visible in the partial cross-section view of FIG. 1; as such, the fourth flap valve 102*d* is represented as a dotted circle in FIG. 1. The fourth flap valve 102*d* has the same features as the first, second, and third flap valves 102*a*, 102*b*, 102*c*. When the first diaphragm plate 160 switches into the open position, the second diaphragm plate 166 switches to a compressed position and fluid empties from the second pumping chamber 168. Thus, as the first pumping chamber 155 fills up with fluid, the second pumping chamber 168 empties fluid, and vice versa, such that the diaphragm pump is continuously pumping fluid from the inlet pipe 172 to the outlet pipe 174 of the pump. The first and second diaphragm plates 160, 166 operate in opposition because they are coupled to the same connecting rod 170.

As will be discussed further herein, the configuration of the flap valves 102*a-d* may improve the efficiency of opening and closing the flap valves 102*a-d*, improve the seal of the flap valves 102*a-d* at their respective openings, reduce noise of the flap valves 102*a-d*, reduce stress on the flap valve 102*a-d* to thereby increase the longevity of the flap valve 102*a-d*, and increase the volumetric flow rate of fluid passing through the openings at the respective flap valves 102*a-d*. For example, in some implementations, fluid flowing through the disclosed flap valve 102*a-d* has a volumetric flow rate that is 10 percent higher than a volumetric flow rate of fluid flowing through other flap valves.

Figure 2:
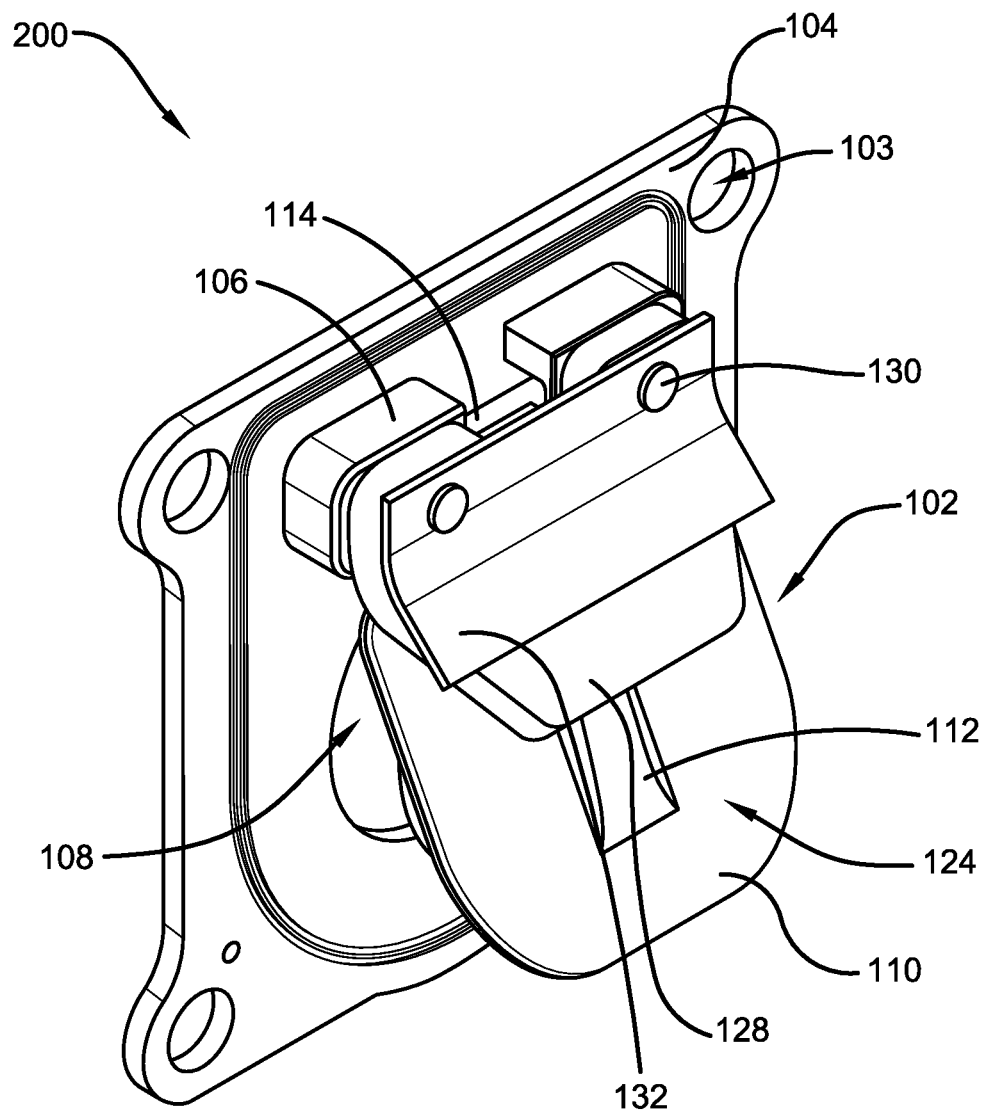
FIG. 2 illustrates a perspective view of some implementations of a valve assembly in an open position disclosed herein.
Figure 3:
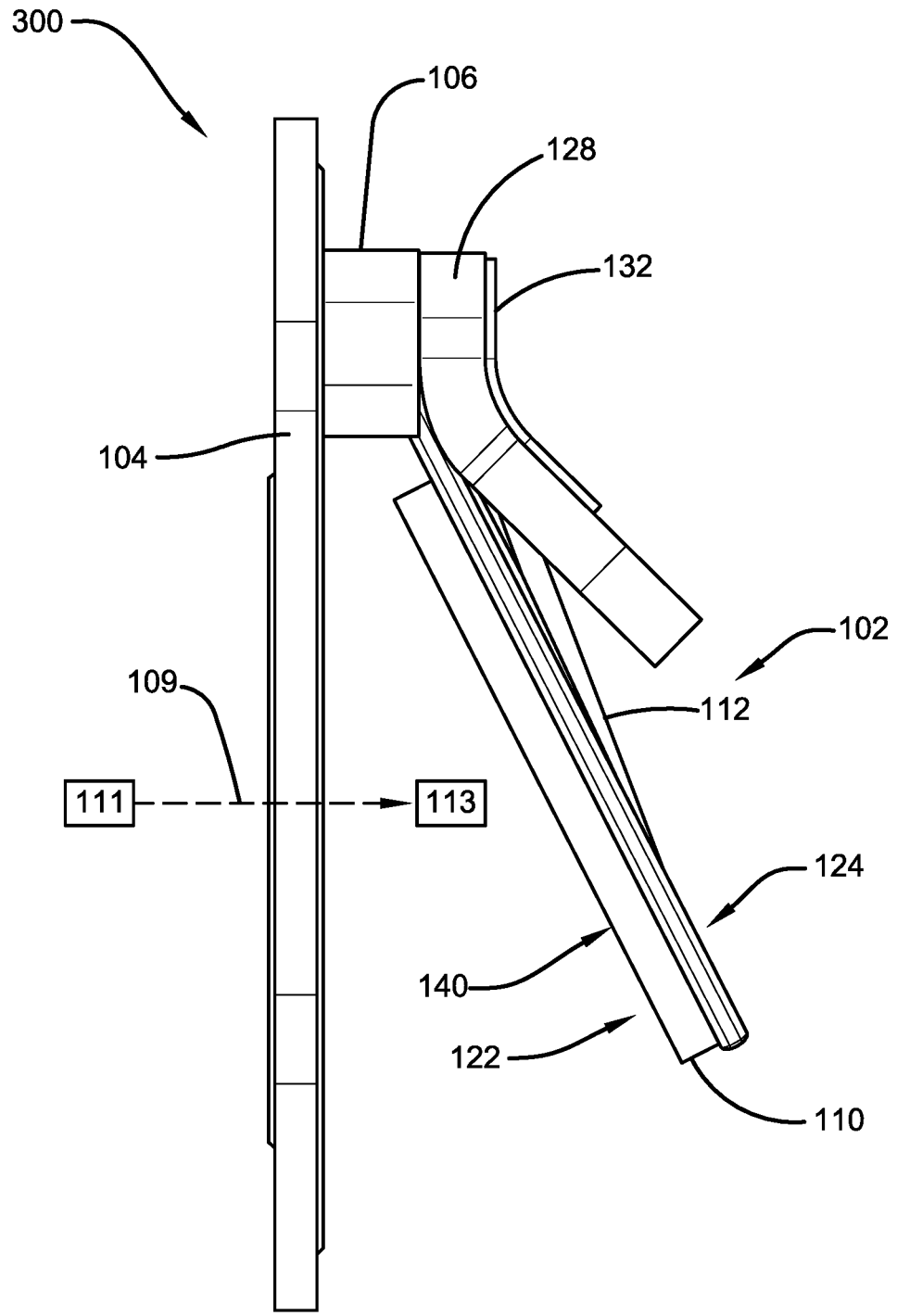
FIG. 3 illustrates a side view of some implementations of a valve assembly in an open position disclosed herein.
Figure 4:
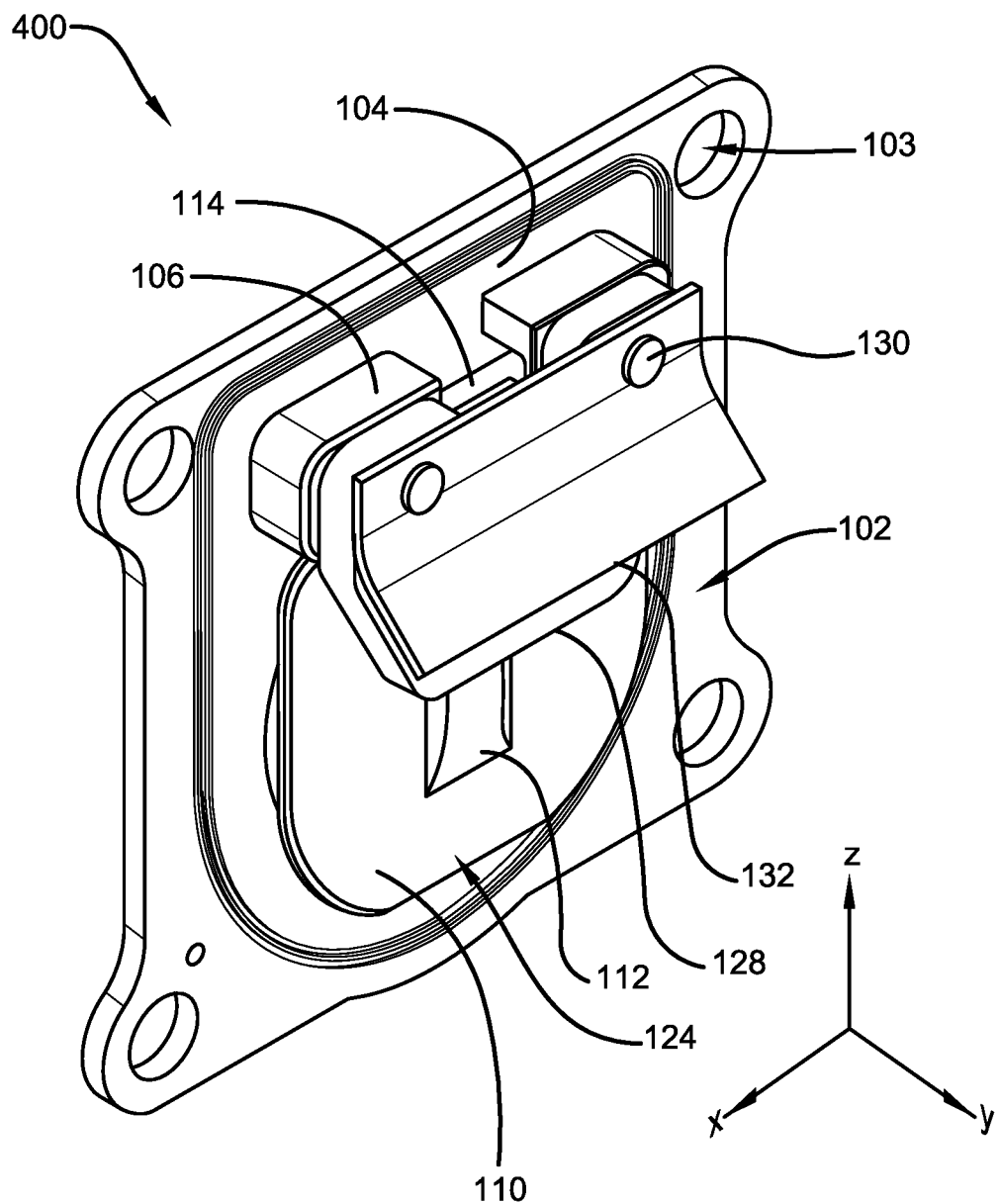
FIG. 4 illustrates a perspective view of some implementations of the valve assembly in a closed position disclosed herein.
Figure 5:
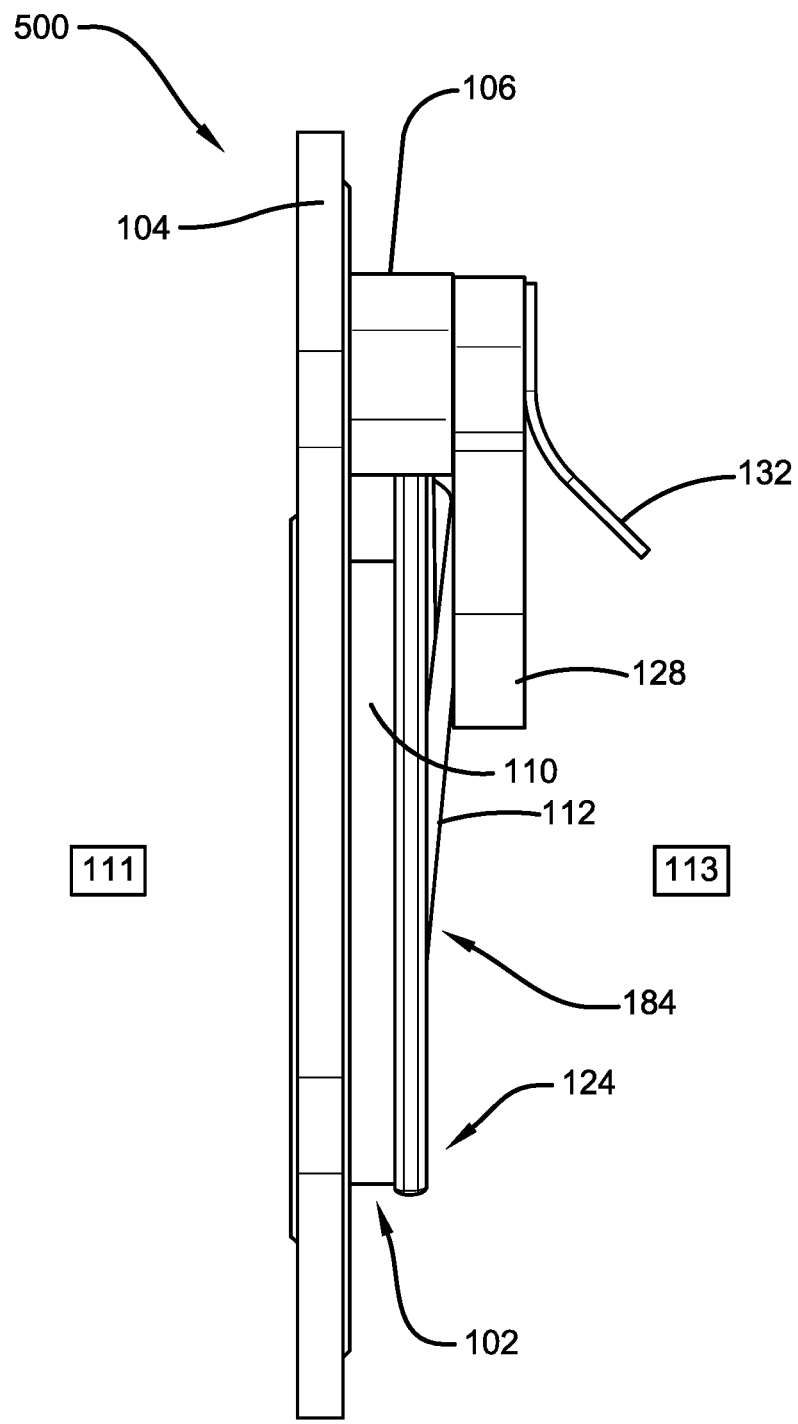
FIG. 5 illustrates a side view of some implementations of the flap valve disclosed herein in the closed position.
Figure 6:
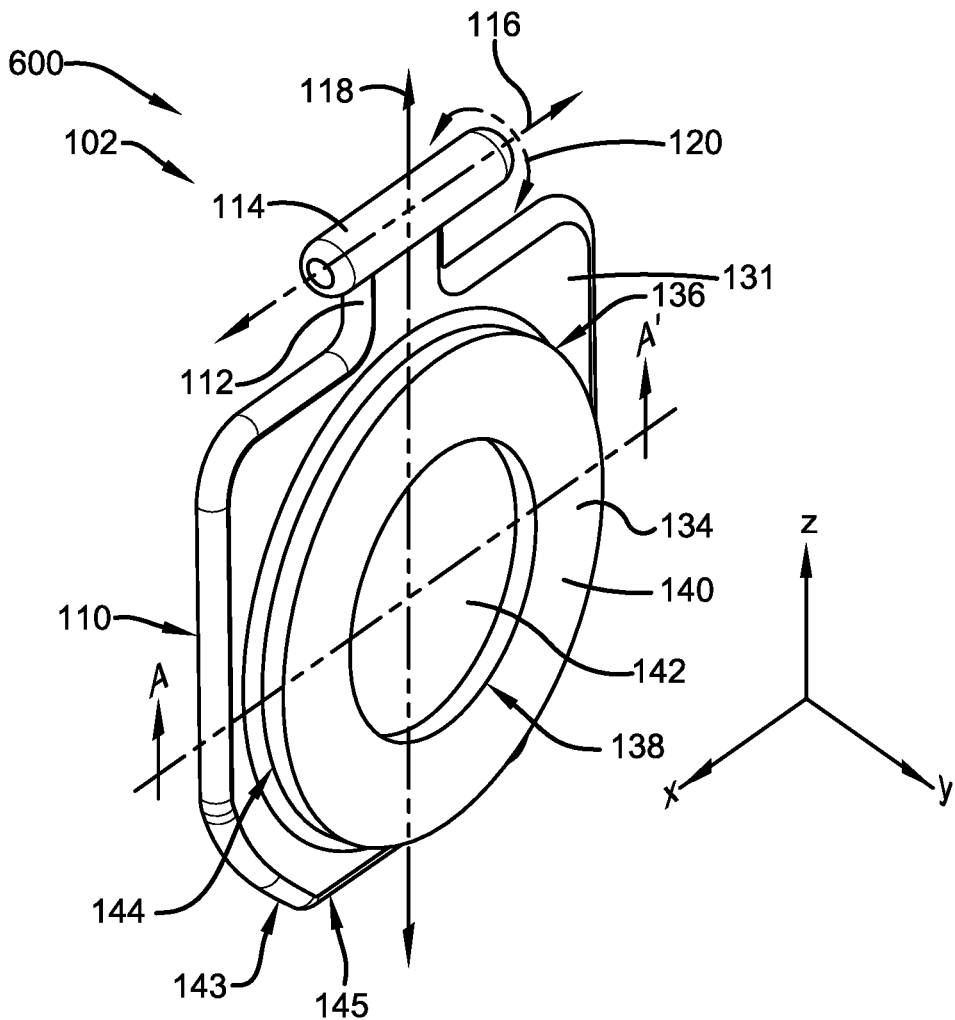
FIG. 6 illustrates a perspective view of some implementations of a flap valve disclosed herein.

FIGS. 2, 3, 4, 5, and 6 will be described together. FIG. 2 illustrates a perspective view 200 of some implementations of a valve assembly for use in a pump system when in an open position. FIG. 3 illustrates a side view 300 that corresponds to the perspective view 200 of FIG. 2. FIG. 4 illustrates a perspective view 400 of some implementations of the valve assembly in a closed position. FIG. 5 illustrates a side view 500 that corresponds to the perspective view 400 of FIG. 4. FIG. 6 illustrates a perspective view 600 of a front portion of some implementations of a flap valve 102 of the valve assembly. It will be appreciated that the flap valves 102 disclosed herein may correspond to any one of the first, second, third, or fourth flap valves 102*a-d* in FIG. 1.

In some implementations, the flap valve is 102 operably connected to a valve seat 104 via a retainer structure 106. The valve seat 104 may be a substantially plate-like structure comprising an opening 108, wherein the flap valve 102 is configured to form a seal with the valve seat 104 to close the opening 108. In some other implementations, the flap valve 102 is instead fixed to some other surface within the pump to control the flow of a fluid by way of opening and closing the opening 108 of the flap valve 102. The valve assembly has an upstream side 111 and a downstream side 113 opposite to the upstream side 111. Fluid is configured to flow through the opening 108 of the valve seat 104 from the upstream side 111 to the downstream side 113 as illustrated by arrow 109 when the flap valve 102 is in the open position. The upstream side 111 may also be referred to as an inlet portion of the valve assembly, and the downstream side 113 may also be referred to as the outlet portion of the valve assembly. The flap valve 102 is operably connected to the downstream side 113 of the valve seat 104 such that fluid flow (e.g., arrow 109) can force open the flap valve 102.

The flap valve 102 may include a body 110, a stem portion 112, and a self-centering hinge portion 114. The stem portion 112 is operably connected to the body 110 and the self-centering hinge portion 114. The stem portion 112 may be disposed between and connect the body 110 to the self-centering hinge portion 114 of the flap valve 102. The self-centering hinge portion 114 extends along a dynamically changing longitudinal axis 116 that is horizontal. The dynamically changing longitudinal axis 116 extends in a same direction as an x-axis. The stem portion 112 and body 110 hang from and extend below the self-centering hinge portion 114 in a vertical direction along a z-axis when the flap valve 102 is in the closed position (e.g., FIGS. 4 and 5). The vertical, z-axis is in the direction of gravity. The vertical, z-axis may be perpendicular to the horizontal, x-axis. The flap valve 102 may axially rotate, as illustrated by arrow 120, around the dynamically changing longitudinal axis 116 to rotate between an open position (e.g., FIG. 2) and a closed position (e.g., FIG. 4) with respect to the opening 108 of the valve seat 104.

When the flap valve 102 is in the open position (e.g., FIG. 2), the body 110 of the flap valve 102 rotates away from the valve seat 104 on the downstream side 113 such that fluid can flow downstream through the opening 108 of the valve seat 104. When the flap valve 102 is in the closed position (e.g., FIG. 4), a front portion 122 of the body 110 comprises a sealing surface 140 that forms a seal with the valve seat 104 to close the opening 108 such that fluid cannot flow downstream through the opening 108 of the valve seat 104.

In the closed position, the stem portion 112 and the body 110 hang from the self-centering hinge portion 114 along the z-axis in the direction of gravity. Further, in the closed position, the front portion 122 of the body 110 faces the upstream side 111, whereas a rear portion 124 of the body 110, which is disposed on an opposite side of the body 110 than the front portion 122, faces the downstream side 113.

As best shown in FIG. 5, in some implementations, the flap valve 102 is configured to have a center of gravity at location 184 that is as low as possible on the body 110 of the flap valve 102 to allow gravity to assist with closure of the flap valve 102 over the opening 108 of the valve seat 104. In other words, in some implementations, the location 184 of the center of gravity may be closer to a bottom of the body 110 than to a top of the body 110 of the flap valve 102. In some embodiments, the stem portion 112 extends down the rear portion 124 of the flap valve 102 for added support to the flap valve 102. In some embodiments, the stem portion 112 configuration may also assist in lowering the location 184 of the center of gravity of the flap valve 102.

Further, in some implementations, the location 184 of the center of gravity of the flap valve 102 is offset from the self-centering hinge portion 114. In other words, in some such implementations, the location 184 of the center of gravity does not directly underlie the self-centering hinge portion 114 of the flap valve 102. However, the location 184 of the center of gravity cannot be so far offset from the self-centering hinge portion 114 or so low on the body 110 that the flap valve 102 would be prevented from changing into the open position. The location 184 of the center of gravity of the flap valve 102 biases the flap valve 102 in the closed position such that even if there is fluid residue between the self-centering hinge portion 114 and the retainer structure 106, the force of the flap valve 102 can overcome the friction caused by fluid residue such that the flap valve 102 can still seal with the valve seat 104 in the closed position.

Further, in some implementations, the flap valve 102 also comprises a bias pad 128 operably connected to the rear portion 124 of the flap valve 102. The bias pad 128 is configured to apply force to the rear portion 124 of the flap valve 102 against the fluid flow when in the open position. The bias pad 128 is thus configured to limit the movement of the body 110 of the flap valve 102. Further, the bias pad 128 is configured to assist the flap valve 102 switch into the closed position to form a reliable seal with the valve seat 104 to close the opening 108. The bias pad 128 acts as a dampener and thus, is configured to prevent over-rotation of the flap valve 102 when the flap valve 102 is in the open position. The flap valve 102 could become damaged and/or cause noise pollution if the flap valve 102 is over-rotated and collides with pump housing. In some implementations, the bias pad 128 comprises a flexible material such that it can bend to allow the flap valve 102 to move into the open position. Further, the flexible material of the bias pad 128 does not react with the fluid that flows within the pump, which would contaminate the fluid and also deteriorate the bias pad 128 itself. For example, in some implementations, the bias pad 128 may comprise a polymer or rubber such as bursa, Neoprene®, Santoprene®, ethylene propylene diene monomer, fluoroelastomer, or some other suitable material. In some implementations, the diaphragms (e.g., 158, 164 of FIG. 1) comprises a same or similar material as the bias pad 128.

The flap valve 102 is operably connected to the valve seat 104 at the self-centering hinge portion 114 of the flap valve 102. In some implementations, the retainer structure 106 is operably coupled to the valve seat 104 and partially encapsulates the self-centering hinge portion 114 of the flap valve 102 to rotatably fix the self-centering hinge portion 114 to the valve seat 104. Thus, in some implementations, the self-centering hinge portion 114 of the flap valve 102 is disposed between the valve seat 104 and the retainer structure 106. Fastening means 130, such as a nut and bolt, may be used to fix the retainer structure 106 to the valve seat 104.

As will be discussed further in FIGS. 11-14, the retainer structure 106 may include a cavity (e.g., 176 of FIG. 11) that is configured to receive the self-centering hinge portion 114. Further, the retainer structure 106 may comprise a gap (e.g., 178 of FIG. 11) configured to accommodate the stem portion 112 of the flap valve 102 such that the stem portion 112 can axially rotate around dynamically changing longitudinal axis 116 of the self-centering hinge portion 114. The cavity (e.g., 176 of FIG. 11) of the retainer structure 106 is configured to provide multiple degrees of freedom for the self-centering hinge portion 114 to move within the retainer structure 106. Thus, the longitudinal axis 116 of the self-centering hinge portion 114 of the flap valve 102 can dynamically change positions within the cavity (e.g., 176 of FIG. 11) of the retainer structure 106; this allows the flap valve 102 to self-align and self-center in the closed position to reliably seal to a receiving surface (e.g., 125 of FIG. 10) of the valve seat 104 to close the opening 108. Further, because the self-centering hinge portion 114 has multiple degrees of freedom within the retainer structure 106, fluids and/or solids can be jostled loose by the self-centering hinge portion 114 and removed from the retainer structure 106 to prevent a contaminated and/or a malfunctioning valve assembly.

In some implementations, the flap valve 102 comprises a material that is rigid and maintains its rigidity as the flap valve 102 changes between the open and closed positions. Further, to reduce stress points and connection points that may collect debris and/or cause damage to the flap valve 102, the flap valve 102 is a single unitary piece. For example, the flap valve 102 may be manufactured from a metal alloy such as stainless steel, ductile iron, cast iron, aluminum, or other similar materials. In another implementation, the flap valve 102 may be manufactured from a polymer, thermoplastic polymer, thermoplastic fluoropolymer, fluorocarbon, thermoplastic polyethylene or similar materials. Examples may include polypropylene, polyvinylidene-fluoride or polyvinylidene-difluoride (PVDF), polytetrafluoroethylene (PTFE), ultra-high-molecular-weight-polyethylene (UHMPE), etc. It will be appreciated that the flap valve 102 may be manufactured using any suitable material or any combination of materials that maintains its rigidity as the flap valve 102 moves between its closed and open positions.

In some implementations, a rigid stop structure 132 is disposed on the rear portion 124 of the flap valve 102 such that the bias pad 128 is disposed between the flap valve 102 and the rigid stop structure 132. The rigid stop structure 132 is configured to limit the bias pad 128 and the body 110 of the flap valve 102. The rigid stop structure 132 may be coupled to the valve seat 104 using the same fastening means 130 that couple the retainer structure 106 and the bias pad 128 to the valve seat 104. In some implementations, the rigid stop structure 132 comprises a rigid material to reliably stop the flap valve 102 from over rotation at a predetermined angle or position within the pump. The predetermined angle or position of the rigid stop structure 132 is configured such that when the flap valve 102 is in the open position, the flap valve 102 does not collide with other features of the pump besides for the bias pad 128 and the rigid stop structure 132. Thus, both the flap valve 102 and the rigid stop structure 132 comprise rigid materials compared to the bias pad 128, which comprises a flexible material. In some implementations, the bias pad 128 comprises a flexible material which helps in noise reduction and damage reduction as the rigid flap valve 102 is stopped by the rigid stop structure 132 when in the open position.

As best shown in FIG. 6, in some implementations, the front portion 122 of the flap valve 102 comprises a front face 131 and a raised portion 134 disposed on the front face 131 and protruding away from the front face 131 of the front portion 122 of the body 110 and away from the rear portion 124 of the body 110. In some implementations, the raised portion 134, the body 110, the self-centering hinge portion 114, and the stem portion 112 of the flap valve 102 may be a single unitary piece for mechanical integrity and robustness. The raised portion 134 has an outer perimeter 136 and an inner perimeter 138. In some implementations, the outer perimeter 136 and the inner perimeter 138 are circular. The inner and outer perimeters 136, 138 of the raised portion 134 define a sealing surface 140 configured to fit over the opening 108 of the valve seat 104 to form a seal at a receiving surface (e.g., 125 of FIG. 10) of the valve seat 104 when the flap valve 102 is in the closed position. The sealing surface 140 is coupled to the front face 131 by a raised sidewall 144 extending in away from the front face 131 along the y-axis. Further, a recessed portion 142 is arranged below the inner perimeter 136 of the raised portion 134, the recessed portion 142 being offset from the front face 131 of the body 110 of the flap valve 102. The front face 131, the sealing surface 140, and the recessed portion 142 may each be surfaces that are substantially normal to the y-axis. It will be appreciated that in some other implementations, the raised and recessed portions 134, 142 may be some other shaped protrusion than what is shown in FIG. 6 to form a suitable seal with the valve seat 104.

Figure 7:
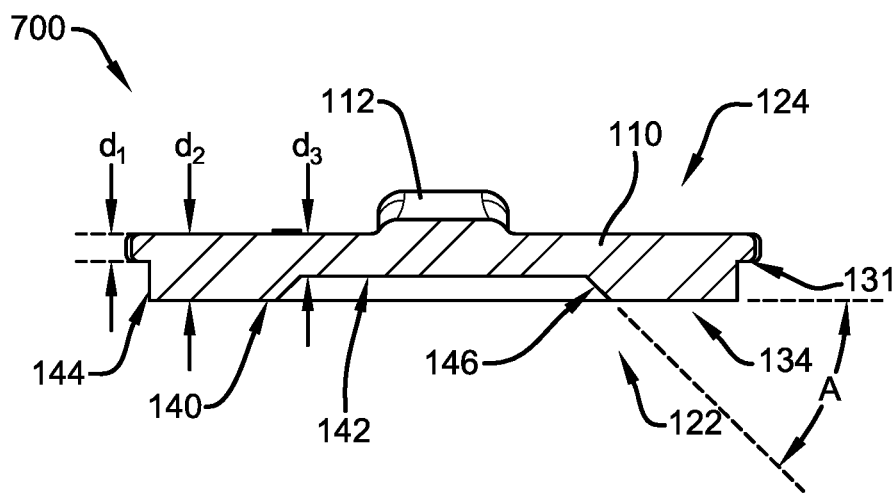
FIG. 7 illustrates a cross-sectional view of some implementations of the flap valve disclosed herein.
Figure 8:
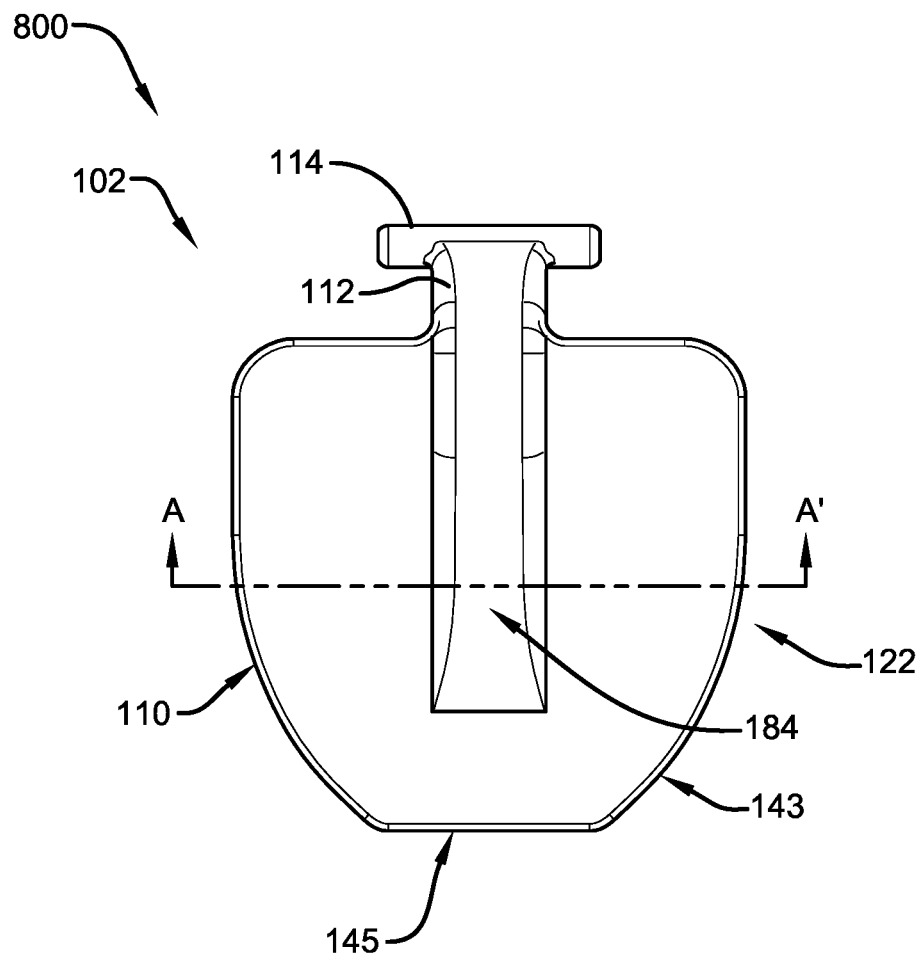
FIG. 8 illustrates a back view of some implementations of the flap valve disclosed herein.

FIG. 7 illustrates a cross-sectional view 700 of some implementations of the flap valve 102. The cross-sectional view 700 may correspond with cross-section line AA' of FIG. 6. FIG. 8 illustrates a back view of the rear portion 124 of some implementations of the flap valve 102. FIGS. 7 and 8 will be described together and in view of with FIGS. 1-6.

The front face 131 is disposed at a first distance $d_1$ away from the rear portion 124 of the body 110 of the flap valve 102; the recessed portion 142 is disposed at a second distance $d_2$ away from the rear portion 124 of the body 110 of the flap valve 102; and the sealing surface 140 of the raised portion 134 is disposed at a third distance $d_3$ away from the rear portion 124 of the body 110 of the flap valve 102. In some implementations, the first distance d is less than the second and third distances $d_2$, $d_3$, and the second distance $d_2$ is less than the third distance $d_3$. In some other implementations, the second distance $d_2$ may be about equal to the first distance $d_1$ and may be less than the first distance $d_3$.

Further, in some implementations, an inner surface 146 of the raised portion 134 at the inner perimeter 138 of the raised portion 134 is chamfered. The inner surface 146 connects the recessed portion 142 to the sealing surface 140. In some embodiments, the chamfered inner surface 146 is position at an angle A. In some implementations, the angle A is equal to approximately 45 degrees. In some other implementations, the angle A is in a range of between, for example, approximately 35 degrees and approximately 45 degrees. In some implementations the raised sidewall 144 is not chamfered, and thus makes a 90 degree angle with the front face 131 of the body 110 of the flap valve 102.

Because of the configurations of the raised portion 134, the recessed portion 142, and the inner surface 146 of the flap valve 102, in some implementations, a pressure differential is made on the front portion 122 of the flap valve 102 that assists the flap valve 102 in making a more reliable seal with the valve seat 104 and also that assists in improving the volumetric flow rate of the fluid flow through the opening 108 of the valve seat 104. Thus, a broken seal near a bottom of the body 110 is prevented when the flap valve 102 is in the closed position. Further, the force distribution on the flap valve 102 is substantially uniform across the self-centering hinge portion 114, the stem portion 112, and the front portion 122 of the flap valve 102 when pressure is applied to the front portion 122 of the flap valve 102. For example, in some implementations, 100 pound-force per square inch may be applied to the front portion 122 of the flap valve 102 when in the closed position; in some such implementations, the flap valve 102 may move into the open position without damage to and/or concentrated stress or strain within the flap valve 102 because of the substantially uniform distribution of the force on the flap valve 102. Thus, fracture of the flap valve 102 is reduced, thereby increasing lifetime of the flap valve 102.

In some implementations, although the opening 108 of the valve seat 104 is substantially circular, the perimeter of the body 110 of the flap valve 102 has a square-like shape that is larger than the opening 108 of the valve seat 104 to increase the surface area of the body 110 of the flap valve 102. This increased surface area of the body 110 assists the flap valve 102 in staying in the open position as fluid flows out of the valve assembly because the force from fluid flow contacts more areas of the front portion 122 of the body 110 of the flap valve 102. However, lower sidewalls 143 of the perimeter of the body 110 of the flap valve 102 may be substantially curved, and a bottom sidewall 145 of the perimeter of the body 110 of the flap valve 102 may be substantially flat. Thus, the body 110 of the flap valve 102 may comprise a substantially square shaped perimeter proximate the self-centering hinge portion 114, a circular shaped perimeter oppositely disposed from the square shaped perimeter, a circular raised portion 134, and a recessed portion 142 that is circular and concentrically disposed within the circular raised portion 134. The configuration of the lower and bottom sidewalls 143, 145 are more circularly shaped and not square-like such that the lower area of the body 110 does not collide with other surfaces (e.g., an elbow portion of the pump housing, a diaphragm plate, etc.) of the pump when in the open position.

Figure 9:
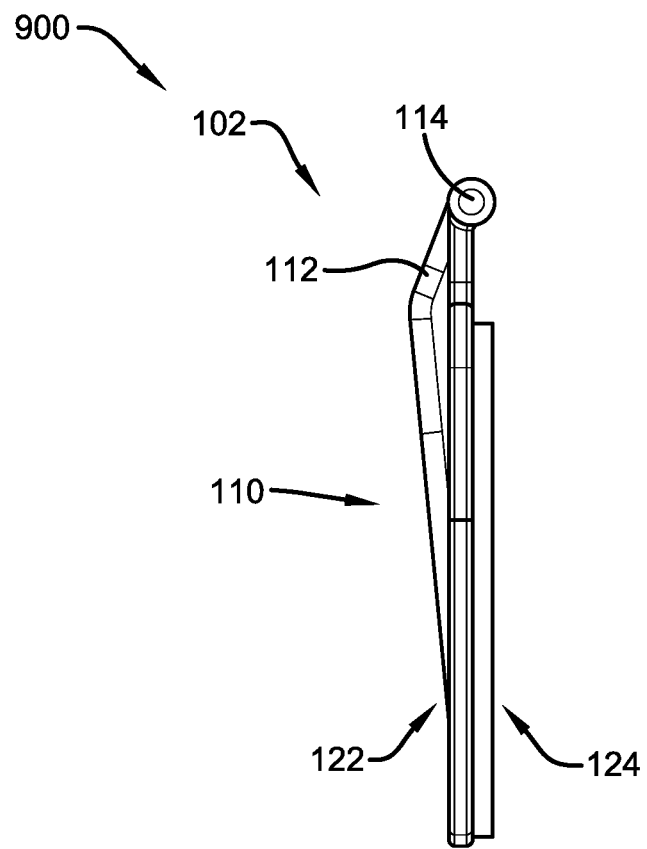
FIG. 9 illustrates a side view of some implementations of the flap valve disclosed herein.

FIG. 9 illustrates a side view 900 of some implementations of the flap valve 102 that may correspond to the flap valve 102 of FIG. 8. In some implementations, the stem portion 112 has a substantially triangular profile from the side view 900 perspective, wherein the thickness of the stem portion 112 from the side portion decreases along a length of the body 110. This stem portion 112 configuration may be implemented to configure the flap valve 102 to have center of gravity that biases the flap valve 102 into the closed position.

Figure 10:
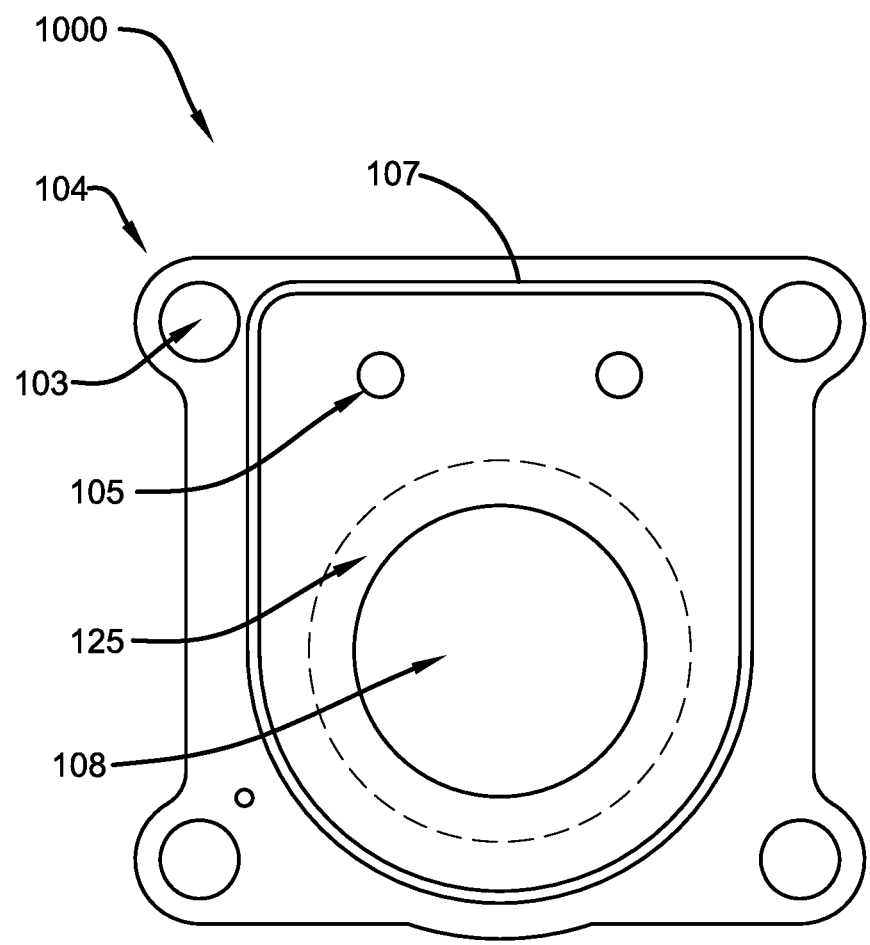
FIG. 10 illustrates a front view of some implementations of a valve seat disclosed herein.

FIG. 10 illustrates a front view 1000 of some implementations of the valve seat 104. The valve seat 104 may comprise outer holes 103 configured to receive fastening means to fix the valve seat 104 to a location within the pump. The valve seat 104 also comprises inner holes 105 configured to receive the fastening means (e.g., 130 of FIG. 2) to fix the retainer structure 106 to the valve seat 104. In some implementations, the valve seat 104 may also comprise a sealing structure 107, such as an O-ring, for example, for the valve seat 104 to properly seal with other features of the pump upon installation of the valve seat 104.

FIG. 10 will now be discussed together with FIG. 6. The valve seat 104 further comprises a receiving surface 125 that is arranged between the dotted-circle and the opening 108. When the flap valve 102 is in the closed position, the sealing surface 140 of the flap valve 102 forms a seal with the receiving surface 125 of the valve seat 104 to close the opening 108. Thus, the dotted-circle in FIG. 10 illustrates where the outer perimeter 136 of the sealing surface 140 would contact the receiving surface 125. As such, it will be appreciated that the dotted-circle is for illustration purposes only and may be larger or smaller than what is shown depending on the size of the sealing surface 140 of the flap valve 102.

Figure 11:
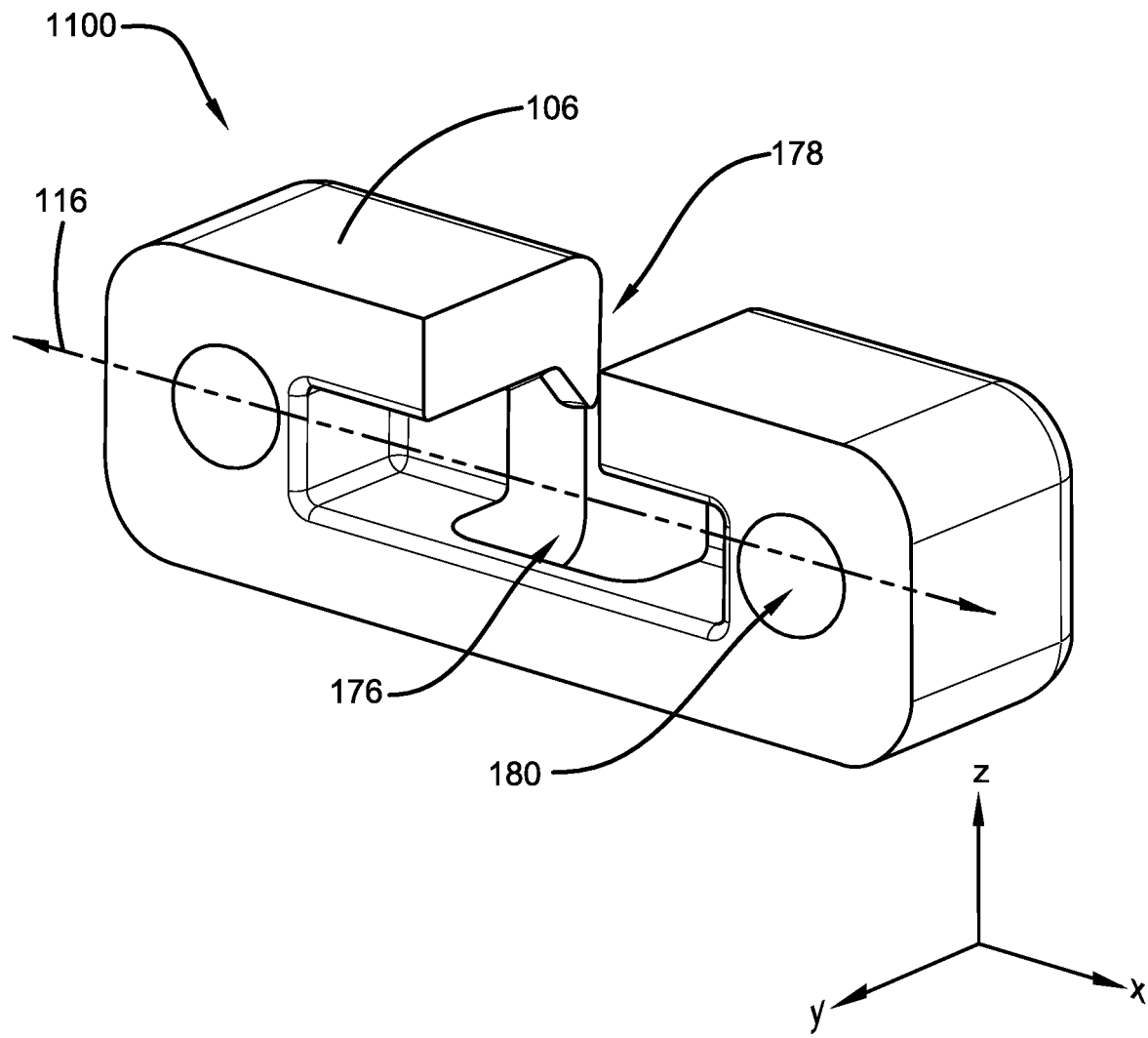
FIG. 11 illustrates a perspective view of some implementations of a retainer structure disclosed herein.

FIG. 11 illustrates a perspective view 1100 of the retainer structure 106. FIG. 11 will be described in conjunction with FIGS. 2-5. In some implementations, the retainer structure 106 comprises a cavity 176 defined therein to accommodate the self-centering hinge portion 114 of the flap valve 102. The cavity 176 of the retainer structure 106 is elongated in the direction of the dynamically changing longitudinal axis 116 to accommodate the self-centering hinge portion 114 of the flap valve 102. The retainer structure 106 also comprises a gap 178 defined therein to accommodate the stem portion 112 of the flap valve 102 when the flap valve 102 axially rotates around the dynamically changing longitudinal axis 116 of the self-centering hinge portion 114. The retainer structure 106 may further comprise fastening openings 180 for the retainer structure 106 to be fixed to the valve seat 104 by fastening means 130. For example, the fastening openings 180 may allow a fastening means 130 to affix the retainer structure 106 to the valve seat 104. The fastening means 130 may be, for example, a screw, bolt, rivet, nail, or some other suitable fastening means. Further, it will be appreciated that in some other implementations, the retainer structure 106 may be fixed to some other suitable surface of the pump in any suitable manner according to sound engineering judgment.

FIGS. 12-14 will be described together. FIGS. 12, 13, and 14 illustrate various views 1200, 1300, and 1400, respectively, of the self-centering hinge portion 114 within the retainer structure 106. FIGS. 13 and 14 correspond to the cross-section line BB' of FIG. 12. The cavity 176 of the retainer structure 106 is dimensioned slightly larger than the self-centering hinge portion 114 of the flap valve 102 such that the self-centering hinge portion 114 can move in various directions. As seen in FIG. 12, the dynamically changing longitudinal axis 116 of the self-centering hinge portion 114 is configured to translate along the x-axis within the cavity 176. As seen in FIG. 13, the dynamically changing longitudinal axis 116 of the self-centering hinge portion 114 is configured to axially rotate, as illustrated by arrow 120, around the dynamically changing longitudinal axis 116, which is coming into and out of the page. As seen in FIG. 14, the dynamically changing longitudinal axis 116 of self-centering hinge portion 114 may also be configured to move in directions about the y- and z-axes. Thus, the cavity 176 of the retainer structure 106 allows the self-centering hinge portion 114 to simultaneously rotate and move in the multiple directions within the cavity 176 while still operably connecting the flap valve 102 to the valve seat 104.

The freedom of movement of the self-centering hinge portion 114 that is provided by the slightly larger cavity 176 of the retainer structure 106 allows the flap valve 102 to self-align and self-center onto the receiving surface 125 of the valve seat 104 when in the closed position. For example, the flap valve 102 may simultaneously rotate and move along the x-, y-, and/or z-axes to achieve an accurate and flat seal with the receiving surface 125 of the valve seat 104 to close the opening 108. Because the self-centering hinge portion 114 can essentially float within the cavity 176, less stress and strain is imposed on the stem portion 112 of the flap valve 102, thereby preventing the flap valve 102 from breaking at the stem portion 112.

Further, any trapped debris between the self-centering hinge portion 114 and the cavity 176 may be jostled free from the retainer structure 106 as the self-centering hinge portion 114 rotates and/or as the self-centering hinge portion 114 translates along the x-, y-, and/or z-axes. Removal and/or prevention of debris in the cavity 176 of the retainer structure 106 allows the self-centering hinge portion 114 to freely rotate within the cavity 176 and prevents contamination within the cavity 176 after cleaning of the pump.

FIG. 15 illustrates a partial cross-section of a perspective view 1500 of some implementations of alternative embodiment of an exemplary diaphragm pump. In some implementations, the material of housing 148 the exemplary pump of FIG. 15 may be non-metallic, such as, for example, a plastic, whereas the material of housing 148 of the exemplary pump of FIG. 1 may be metallic. However, regardless of the material and/or design of the overall pump, the disclosed flap valve 102, retainer structure 106, bias pad 128, and/or rigid stop structure 132 may still be implemented onto a valve seat 104 or some other suitable surface within a diaphragm pump to improve pump performance.

FIG. 16 provides a side view 1600 of an alternative implementation of the valve assembly. In some other implementations, the stem portion 112 of the flap valve 102 further comprises a counterweight portion 186 that extends along a rear portion 124 of the body 110 of the flap valve 102. The counterweight portion 186 of the flap valve 102 may act to move the center of gravity to a desired location 184 on the rear portion 124 of the body 110 of the flap valve 102. The use of the counterweight portion 186 may increase the dimensions of the side view 1600 of the flap valve 102, which may limit how far the flap valve 102 can rotate into the open position. In some other implementations, the location 184 of the center of gravity of the flap valve 102 may be configured by adjusting the material or composition of the flap valve 102. For example, the body 110 of the flap valve 102 may be hollow or substantially hollow such that the center of gravity is at a location 184 further away from the front portion 122 and closer to the rear portion 124 of the body 110 of the flap valve 102. It will be appreciated that other manners to adjust the center of gravity of the flap valve 102 to be at a desired location 184 are also within the scope of this disclosure.

FIG. 17 illustrates a perspective view 1700 of an alternative implementation of a valve assembly. In some other implementations, the body 110 of the flap valve 102 has a circular shape similar to the circular shape of the opening 108 of the valve seat 104. In such implementations, although the surface area of the body 110 of the flap valve 102 in FIG. 17 is reduced compared to the oversized, square-like body of the flap valve 102 illustrated in FIG. 8, for example, material costs are reduced. Further, in some other implementations, the flap valve 102 may comprise a hinge portion 193 that is operably coupled to the valve seat 104 through a bracket 190. In some such implementations, the stem portion 112 and/or self-centering hinge portion 114 are disposed between outer openings 192 of the bracket 190, and a pin 194 or some other suitable fastener extends through the outer openings 192 of the bracket 190 and the hinge portion 193 to rotatably attach the flap valve 102 to the bracket 190. In some such other implementations, the hinge portion 193 may not be able to move in directions of the x-, y-, and z-axes within the bracket 190, and thus, may not be self-centering. It will be appreciated that in some other implementations, the flap valve 102. In FIG. 17 may instead be fixed to the valve seat 104 using the retainer structure 106 disclosed in FIG. 11 such that the hinge portion 193 is self-centering.

FIGS. 18 and 19 will be described together. FIG. 18 illustrates a front view 1800 of yet another alternative implementation of the flap valve 102. FIG. 19 illustrates a side-view 1900 corresponding to the flap valve 102 illustrated in FIG. 18.

In some other implementations, the front portion 122 of the body 110 of the flap valve 102 may comprise a center protrusion 196 that exhibits a cone-like profile as seen in FIG. 19. The center protrusion 196 protrudes away from the front portion 122. The front portion 122 further comprises an outer sealing surface 198 that surrounds the center protrusion 196. The center protrusion 196 is configured to protrude through the opening (e.g., 108 of FIG. 10) of the valve seat (e.g., 104 of FIG. 10) while the outer sealing surface 198 seals with the receiving surface (e.g., 125 of FIG. 10) of the valve seat (e.g., 104 of FIG. 10) when the flap valve 102 is in the closed position. The center protrusion 196 may help mitigate unwanted forces or jamming of the flap valve 102 by deflecting and/or redirecting debris away from the flap valve 102 when the flap valve 102 is in the open position. It should be appreciated that the center protrusion 196 may be flat, round, curved, or any other shape or size according to sound engineering judgment. Further, in some other implementations, the stem portion 112 comprises a chamfered surface on the front portion 122 of the flap valve 102 to assist with deflection of debris away from the flap valve 102.

Further, in some implementations, o-rings 202 may be disposed on the self-centering hinge portion 114. The o-rings 202 may protect the self-centering hinge portion 114 while moving within the cavity (e.g., 176 of FIG. 11) of the retainer structure (e.g., 106 of FIG. 11) and/or may reduce noise while the self-centering hinge portion 114 moves within the cavity (e.g., 176 of FIG. 11) of the retainer structure (e.g., 106 of FIG. 11). The o-rings 202 may be formed of materials such as, but not limited to polyurethane, PTFE, nitrile, silicon, ethylene propylene, fluorocarbon, Viton®, Teflon®, or Neoprene®.

Additionally, in some implementations, the self-centering hinge portion 114 of the flap valve 102 comprises a stop portion 204 that protrudes away from the self-centering hinge portion 114. The stop portion 204 is configured to collide with a portion of the valve assembly, such as the valve seat 104 or retainer structure 106, before the flap valve 102 collides with a different portion of the pump housing to prevent over-rotation of the flap valve 102. In some such embodiments, the stop portion 204 may be used in place of or in addition to the rigid stop structure 132.

FIGS. 20 and 21 will be described together. FIG. 20 illustrates a side view 2000 of yet another alternative implementation of a valve assembly, and FIG. 20 illustrates a top-view 2100 of the valve assembly corresponding to FIG. 21.

In some such other implementations, the self-centering hinge portion 114 may be disposed between a retainer plate cover 206 and the retainer structure 106. In some such embodiments, the cavity 176 is defined by the retainer structure 106 and the retainer plate cover 206 such that the retainer plate cover 206 assists in fixing the self-centering hinge portion 114 to the valve seat 104. The retainer plate cover 206 may comprise protrusions 210 configured to interlock with the retainer plate cover 206. The fastening means 130 may also extend through the retainer plate cover 206 to fix the retainer plate cover 206 to the retainer structure 106 and to the valve seat 104. The retainer plate cover 206 may provide more protection to the self-centering hinge portion 114 but also may make it more difficult for debris to escape space around the self-centering hinge portion 114 and the cavity 176.

Moreover, the word "exemplary" is used herein to mean serving as an example, instance or illustration. Any aspect or design described herein as "exemplary" is not necessarily, to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A flap valve for a diaphragm pump, comprising:
   a body configured to move between an open position and a closed position, the body having a front portion and a rear portion, wherein the front portion includes a front surface comprising a raised portion and a recessed portion, wherein the front surface is configured to form a seal with a surface of the diaphragm pump when the body is in the closed position, wherein the body is configured to allow a downstream flow of a fluid when the flap valve is in the open position, and wherein the surface of the diaphragm pump is disposed at an inlet portion or an outlet portion of a pumping chamber within the diaphragm pump;
   a self-centering hinge portion operably connected to the body and operably connected to the surface of the diaphragm pump, the self-centering hinge portion having a dynamically changing longitudinal axis, the body configured to translate about the dynamically changing longitudinal axis and simultaneously rotate about the dynamically changing longitudinal axis to close against the surface of the diaphragm pump; and
   a bias pad operably connected to the rear portion of the body, the bias pad configured to apply force to the rear portion against the direction of fluid flow.

2. The flap valve of the claim 1, wherein the surface of the diaphragm pump is a valve seat.

3. The flap valve of claim 1, wherein the body comprises a substantially square shaped perimeter proximate the self-centering hinge portion, a circular shaped perimeter oppositely disposed from the substantially square shaped perimeter, and a circular raised portion, wherein the recessed portion is circular and concentrically disposed within the circular raised portion.

4. The flap valve of claim 1, wherein the flap valve is formed of a metal or metal alloy.

5. The flap valve of claim 1, wherein the body comprises a center of gravity that is configured to bias the body in the closed position.

6. The flap valve of claim 1, wherein the bias pad is configured to limit movement of the body.

7. The flap valve of claim 1, further comprising a rigid stop structure operably connected to the bias pad, the rigid stop structure configured to limit rotation of the bias pad and the body.

8. The flap valve of claim 1, wherein the body comprises a rigid material, and wherein the bias pad comprises a flexible material.

9. The flap valve of claim 1, further comprising a stem portion operably connected to the body and the self-centering hinge portion.

10. The flap valve of claim 9, wherein the body, the self-centering hinge portion, and the stem portion are a single unitary piece.

11. The flap valve of claim 1, further comprising a retainer structure operably connected to the surface of the diaphragm pump, the retainer structure having a cavity defined therein and configured to receive the self-centering hinge portion to rotatably fix the body to the surface of the diaphragm pump at the self-centering hinge portion, wherein the cavity is dimensioned to be larger than dimensions of the self-centering hinge portion such that the self-centering hinge portion can rotate and move in multiple directions within the cavity of the retainer structure.

12. The flap valve of claim 11, wherein the self-centering hinge portion translates about an x-axis, wherein the self-centering hinge portion rotates about the dynamically changing longitudinal axis, and wherein the dynamically changing longitudinal axis also moves about a y- and/or z-axis.

13. The flap valve of claim 11, wherein the self-centering hinge portion is a hinge pin.

14. A flap valve for a diaphragm pump comprising:
   a body being configured to switch between an open position and a closed position, the body comprising:
      a front portion configured to sealingly engage with a valve seat, wherein the front portion faces a valve inlet portion; and
      a rear portion oppositely disposed from the front portion, wherein the rear portion is downstream a valve outlet portion, the valve seat disposed between the valve inlet portion and the valve outlet portion and comprising an opening between the valve inlet portion and the valve outlet portion;
   a self-centering hinge portion operably connected to the body, wherein the self-centering hinge portion translates about an x-axis and rotates about a dynamically changing longitudinal axis, wherein the dynamically changing longitudinal axis moves about a y-and/or z-axis;
   a stem portion operably connected to and extending from the rear portion;
   a retainer structure operably connected to the valve seat, wherein the retainer structure comprises a cavity configured to receive the self-centering hinge portion to rotatably fix the body to the valve seat at the self-centering hinge portion, and wherein the cavity has dimensions that are larger than dimensions of the self-centering hinge portion such that the self-centering hinge portion can float in multiple directions within the cavity of the retainer structure to sealingly engage the body to the valve seat; and
   a bias pad coupled to the retainer structure and on the rear portion of the body, wherein the retainer structure is disposed between the valve seat and the bias pad.

15. The flap valve of claim 14, wherein the self-centering hinge portion is configured to rotate axially to permit debris trapped at a location proximate the self-centering hinge portion to exit the location as the self-centering hinge portion rotates.

16. The flap valve of claim 14, wherein the retainer structure has a gap defined therein configured to receive the stem portion.

17. A flap valve for a diaphragm pump, comprising:
   a body configured to move between an open position and a closed position, the body comprising:
      a front portion configured to sealingly engage with a valve seat, wherein the front portion faces a valve inlet portion;
      a rear portion oppositely disposed from the front portion, wherein the rear portion is downstream a valve outlet portion, the valve seat disposed between the valve inlet portion and the valve outlet portion and comprising an opening between the valve inlet portion and the valve outlet portion; and
   a self-centering hinge portion operably connected to the body and operably connected to the valve seat, the self-centering hinge portion having a dynamically changing longitudinal axis, the body configured to translate about the dynamically changing longitudinal axis and simultaneously rotate about the dynamically changing longitudinal axis to close against the valve seat, wherein the self-centering hinge portion translates about an x-axis and rotates about the dynamically changing longitudinal axis, wherein the dynamically changing longitudinal axis moves about a y-and/or z-axis;

a stem portion operably connected to and extending from the rear portion;

a retainer structure operably connected to the valve seat, wherein the retainer structure comprises a cavity defined therein that is configured to receive the self-centering hinge portion to rotatably fix the body to the valve seat at the self-centering hinge portion, and wherein the cavity has dimensions that are larger than dimensions of the self-centering hinge portion such that the self-centering hinge portion can float in multiple directions within the cavity of the retainer structure to sealingly engage the body to the valve seat, the retainer structure having a gap defined therein to receive the stem portion;

a bias pad operably connected to the retainer structure, the bias pad configured to apply force to the rear portion of the body against the direction of fluid flow, the bias pad being a flexible material; and a rigid stop structure operably connected to the bias pad, the rigid stop structure configured to limit rotation of the bias pad and the body, wherein the body, the self-centering hinge portion and the retainer structure are a single unitary piece.

\* \* \* \* \*